(12) United States Patent
Stopniewicz et al.

(10) Patent No.: US 8,135,773 B2
(45) Date of Patent: Mar. 13, 2012

(54) SYSTEM AND METHOD FOR DOWNLOADING FILES

(75) Inventors: Albert J. Stopniewicz, Costa Mesa, CA (US); Belinda Bradford, Maroubra Beach (AU)

(73) Assignee: Panasonic Avionics Corporation, Lake Forest, CA (US)

( * ) Notice: Subject to any disclaimer, the term of this patent is extended or adjusted under 35 U.S.C. 154(b) by 1520 days.

(21) Appl. No.: 10/772,565

(22) Filed: Feb. 4, 2004

(65) Prior Publication Data

US 2005/0044564 A1     Feb. 24, 2005

Related U.S. Application Data

(60) Provisional application No. 60/476,071, filed on Jun. 4, 2003.

(51) Int. Cl.
G06F 15/16 (2006.01)

(52) U.S. Cl. .......................... 709/203; 709/217

(58) Field of Classification Search ................ 709/203, 709/217, 219, 225, 237, 250
See application file for complete search history.

(56) References Cited

U.S. PATENT DOCUMENTS

| | | | |
|---|---|---|---|
| 3,037,812 A | 6/1962 | Monroe | |
| 4,584,603 A | 4/1986 | Harrison | |
| 4,866,515 A | 9/1989 | Tagawa et al. | |
| 4,897,714 A | 1/1990 | Ichise et al. | |
| 5,295,089 A | 3/1994 | Ambasz | |
| 5,311,302 A | 5/1994 | Berry et al. | |
| 5,469,363 A | 11/1995 | Saliga | |
| 5,555,466 A | 9/1996 | Scribner et al. | |
| 5,640,002 A | 6/1997 | Ruppert et al. | |
| 5,701,582 A | 12/1997 | DeBey | |
| 5,709,448 A | 1/1998 | Jennings et al. | |
| 5,760,819 A | 6/1998 | Sklar et al. | |

(Continued)

FOREIGN PATENT DOCUMENTS

JP      6111124      4/1994

(Continued)

OTHER PUBLICATIONS

Ibenthal A. et al: Multimedia im Fahrzeug: Dienste und Technik, Mar. 2000, Fernseh Und Kinotechnik, Vde Verlad GMBH. Berlin, De, pp. 100-105, XP000966339 ISSN: 0015-0142.

(Continued)

*Primary Examiner* — Philip Chea
*Assistant Examiner* — Eric W Shepperd
(74) *Attorney, Agent, or Firm* — Orrick, Herrington & Sutcliffe LLP

(57) ABSTRACT

A passenger entertainment system for use on aircraft and other types of vehicles and methods for manufacturing and using same. The entertainment system comprises a mobile entertainment apparatus that can communicate with a database system having at least one file library. When communicating with the database system, the entertainment apparatus can select and download one or more files from the file libraries. Once the selected files have been downloaded, the entertainment apparatus can present the files regardless of whether communication with the database system is maintained. If the entertainment apparatus is installed in a vehicle, for example, a passenger in the vehicle can download the files during travel to a portable personal entertainment system, which can retain the files even if disconnected from the entertainment apparatus. The passenger thereby can view the files at any time, including after disembarking the vehicle, by removing the personal entertainment system from the vehicle.

15 Claims, 12 Drawing Sheets

U.S. PATENT DOCUMENTS

| | | | |
|---|---|---|---|
| 5,790,175 A | 8/1998 | Sklar et al. | |
| 5,790,787 A | 8/1998 | Scott et al. | |
| 5,835,127 A | 11/1998 | Booth et al. | |
| 5,889,268 A | 3/1999 | Swartz | |
| 5,889,775 A | 3/1999 | Sawicz et al. | |
| 5,953,429 A | 9/1999 | Wakai et al. | |
| 5,959,596 A | 9/1999 | McCarten et al. | |
| 5,966,442 A | 10/1999 | Sachdev | |
| 5,973,722 A | 10/1999 | Wakai et al. | |
| 5,990,928 A | 11/1999 | Sklar et al. | |
| 6,003,008 A | 12/1999 | Postrel et al. | |
| 6,003,030 A * | 12/1999 | Kenner et al. | 1/1 |
| 6,047,165 A * | 4/2000 | Wright et al. | 455/66.1 |
| 6,058,288 A | 5/2000 | Reed et al. | |
| 6,129,274 A | 10/2000 | Suzuki | |
| 6,130,727 A * | 10/2000 | Toyozumi | 348/837 |
| 6,135,549 A | 10/2000 | Demick et al. | |
| 6,151,497 A | 11/2000 | Yee et al. | |
| 6,154,186 A | 11/2000 | Smith et al. | |
| 6,177,887 B1 | 1/2001 | Jerome | |
| 6,201,797 B1 | 3/2001 | Leuca et al. | |
| 6,208,307 B1 | 3/2001 | Frisco et al. | |
| 6,249,913 B1 * | 6/2001 | Galipeau et al. | 725/76 |
| 6,266,664 B1 * | 7/2001 | Russell-Falla et al. | 707/700 |
| 6,286,139 B1 * | 9/2001 | Decinque | 725/5 |
| 6,338,045 B1 | 1/2002 | Pappas | |
| 6,390,920 B1 | 5/2002 | Infiesto et al. | |
| 6,392,692 B1 * | 5/2002 | Monroe | 348/143 |
| 6,487,540 B1 | 11/2002 | Smith et al. | |
| 6,493,744 B1 * | 12/2002 | Emens et al. | 709/203 |
| 6,499,027 B1 * | 12/2002 | Weinberger | 707/4 |
| 6,507,279 B2 | 1/2003 | Loof | |
| 6,507,952 B1 | 1/2003 | Miller et al. | |
| 6,519,693 B1 | 2/2003 | Debey | |
| 6,529,706 B1 * | 3/2003 | Mitchell | 455/12.1 |
| 6,549,754 B1 | 4/2003 | Miller et al. | |
| 6,559,812 B1 | 5/2003 | McCarten et al. | |
| 6,574,338 B1 | 6/2003 | Sachdev | |
| 6,598,227 B1 | 7/2003 | Berry et al. | |
| 6,600,418 B2 | 7/2003 | Francis et al. | |
| 6,609,103 B1 | 8/2003 | Kolls | |
| 6,618,580 B2 * | 9/2003 | Parrott et al. | 713/310 |
| 6,622,124 B1 | 9/2003 | Kolls | |
| 6,637,484 B1 | 10/2003 | Kraft | |
| 6,643,510 B2 | 11/2003 | Taylor | |
| 6,684,240 B1 * | 1/2004 | Goddard | 709/217 |
| 6,693,236 B1 | 2/2004 | Gould et al. | |
| 6,736,315 B2 | 5/2004 | Swartz | |
| 6,757,712 B1 | 6/2004 | Bastian et al. | |
| 6,769,010 B1 * | 7/2004 | Knapp et al. | 709/203 |
| 6,796,495 B2 | 9/2004 | Stahl et al. | |
| 6,876,905 B2 | 4/2005 | Farley et al. | |
| 6,899,390 B2 | 5/2005 | Sanfrod et al. | |
| 6,920,611 B1 * | 7/2005 | Spaeth et al. | 715/700 |
| 6,963,898 B2 * | 11/2005 | Yoshimine et al. | 709/203 |
| 6,970,939 B2 * | 11/2005 | Sim | 709/236 |
| 6,974,076 B1 * | 12/2005 | Siegel | 235/380 |
| 6,985,588 B1 * | 1/2006 | Glick et al. | 380/258 |
| 6,990,338 B2 | 1/2006 | Miller et al. | |
| 7,036,889 B2 | 5/2006 | Sanfrod et al. | |
| 7,100,187 B2 | 8/2006 | Pierzga et al. | |
| 7,124,426 B1 | 10/2006 | Tsuria et al. | |
| 7,359,955 B2 * | 4/2008 | Menon et al. | 709/219 |
| 7,690,012 B2 * | 3/2010 | Luehrs | 725/28 |
| 2002/0046406 A1 * | 4/2002 | Chelehmal et al. | 725/87 |
| 2002/0059614 A1 * | 5/2002 | Lipsanen et al. | 725/75 |
| 2002/0065711 A1 * | 5/2002 | Fujisawa et al. | 705/13 |
| 2002/0094829 A1 | 7/2002 | Ritter | |
| 2002/0095680 A1 | 7/2002 | Davidson | |
| 2002/0162113 A1 * | 10/2002 | Hunter | 725/87 |
| 2002/0178451 A1 | 11/2002 | Ficco | |
| 2003/0003899 A1 | 1/2003 | Tashiro et al. | |
| 2003/0047647 A1 * | 3/2003 | Poblete | 244/118.1 |
| 2003/0107248 A1 | 6/2003 | Sanford et al. | |
| 2003/0130769 A1 * | 7/2003 | Farley et al. | 701/3 |
| 2003/0233658 A1 * | 12/2003 | Keen et al. | 725/76 |
| 2004/0077308 A1 | 4/2004 | Sanford et al. | |
| 2004/0098745 A1 | 5/2004 | Marston et al. | |
| 2004/0167967 A1 | 8/2004 | Bastian et al. | |
| 2004/0183346 A1 | 9/2004 | Sanford et al. | |
| 2004/0192339 A1 * | 9/2004 | Wilson et al. | 455/456.1 |
| 2005/0044564 A1 | 2/2005 | Stopniewicz | |
| 2005/0270373 A1 | 12/2005 | Trela | |

FOREIGN PATENT DOCUMENTS

| | | | |
|---|---|---|---|
| WO | WO 00/22488 A1 | | 4/2000 |
| WO | WO 03032503 A2 * | | 4/2003 |
| WO | WO 03/050000 A1 | | 6/2003 |
| WO | WO 2004/003696 A2 | | 1/2004 |
| WO | WO 2004/003696 A3 | | 1/2004 |
| WO | WO 2004/008277 A2 | | 1/2004 |

OTHER PUBLICATIONS

Chen Y. et al., Personalized Multimedia Services Using a Mobile Service Platform, 2002 IEEE, 0-7803-7376-6/02, Mar. 17, 2002, pp. 918-925.

Gratschew, S., et al., A Multimedia Messaging Platform for Content Delivering, 2003 IEEE, 0-7803-7661-7/03, Feb. 23, 2003, pp. 431-435.

US, Office Action, U.S. Appl. No. 09/811,317, Feb. 28, 2002.
US, Office Action, U.S. Appl. No. 09/811,317, Aug. 13, 2002.
US, Office Action, U.S. Appl. No. 09/811,317, Dec. 30, 2002.
US, Notice of Allowance and Fees due, U.S. Appl. No. 09/811,317, Jul. 14, 2003.
US, Office Action, U.S. Appl. No. 08/479,654, Jan. 24, 1997.
US, Office Action, U.S. Appl. No. 08/479,654, Aug. 21, 1995.
US, Office Action, U.S. Appl. No. 08/479,654, Mar. 1, 1996.
US, Office Action, U.S. Appl. No. 08/479,654, Aug. 5, 1997.
US, Office Action, U.S. Appl. No. 08/863,448, Sep. 24, 1997.
US, Office Action, U.S. Appl. No. 08/863,448, Apr. 27, 1998.
US, Notice of Allowance and Fees due, U.S. Appl. No. 08/863,448, Feb. 17, 1999.
US, Office Action, U.S. Appl. No. 08/071,218, Dec. 7, 1994.
US, Office Action, U.S. Appl. No. 08/071,218, Apr. 20, 1995.
US, Notice of Allowance and Fees due, U.S. Appl. No. 08/071,218, Aug. 7, 1995.
US, Office Action, U.S. Appl. No. 08/480,666, Feb. 9, 1996.
US, Office Action, U.S. Appl. No. 08/480,666, Sep. 5, 1996.
US, Office Action, U.S. Appl. No. 08/480,666, Oct. 16, 1996.
US, Office Action, U.S. Appl. No. 08/480,666, Nov. 22, 1996.
US, Office Action, U.S. Appl. No. 08/363,228, Oct. 3, 1995.
US, Office Action, U.S. Appl. No. 08/363,228, Mar. 27, 1996.
US, Notice of Allowance and Fees due, U.S. Appl. No. 08/363,228, Apr. 6, 1996.
EP, Notice of Intention to Grant, Mar. 20, 2009.
US, Office Action, U.S. Appl. No. 09/952,629, Mar. 14, 2006.
US, Office Action, U.S. Appl. No. 09/952,629, Dec. 1, 2006.
US, Office Action, U.S. Appl. No. 09/952,629, Jun. 27, 2007.
US, Office Action, U.S. Appl. No. 09/952,629, Oct. 27, 2008.
US, Office Action, U.S. Appl. No. 09/952,629, Mar. 18, 2008.
US, Office Action, U.S. Appl. No. 09/952,629, Jun. 2, 2009.
JP, Office Action, 2006-000840, Feb. 28, 2007.
Y.F. Chen, et al., "Personalized Multimedia Services Using a Mobile Service Platform", IEEE 2002, pp. 918-215.
S. Gratschew, et al., "A Multimedia Messaging Platform for Content Delivering", IEEE 2003, pp. 431-435.
A. Ibenthal, et al.,"Multimedia im Fahrzeug: Dienste und Technik", Fernseh und Kino-Technik 54, Jahrgag Nr. 3/20, pp. 100-105.
Japanese Final Office Action, Decision of Refusal, Jul. 5, 2011.

* cited by examiner

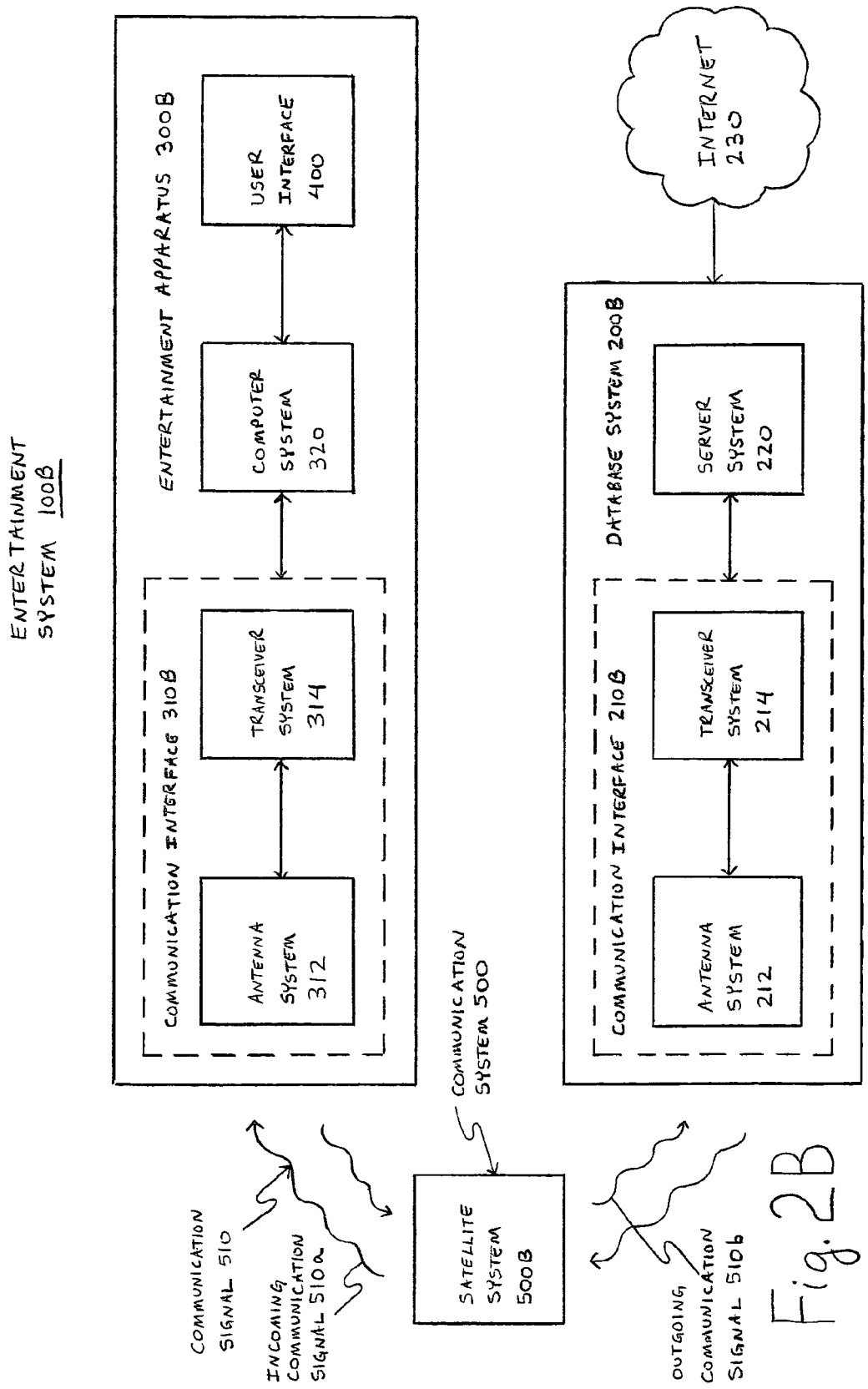

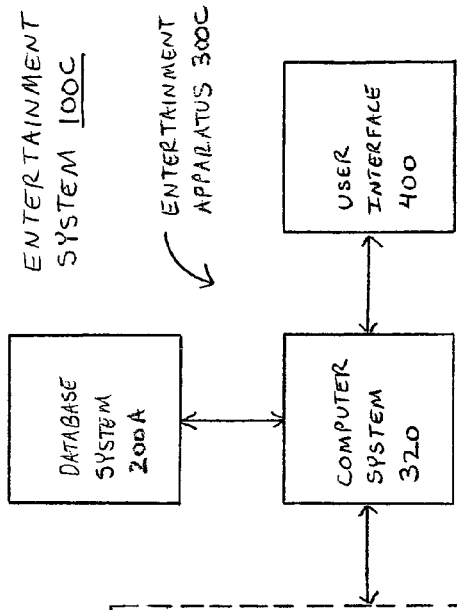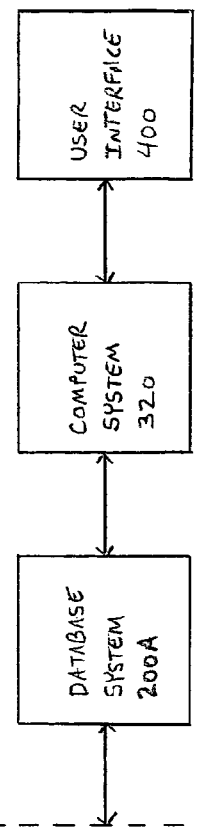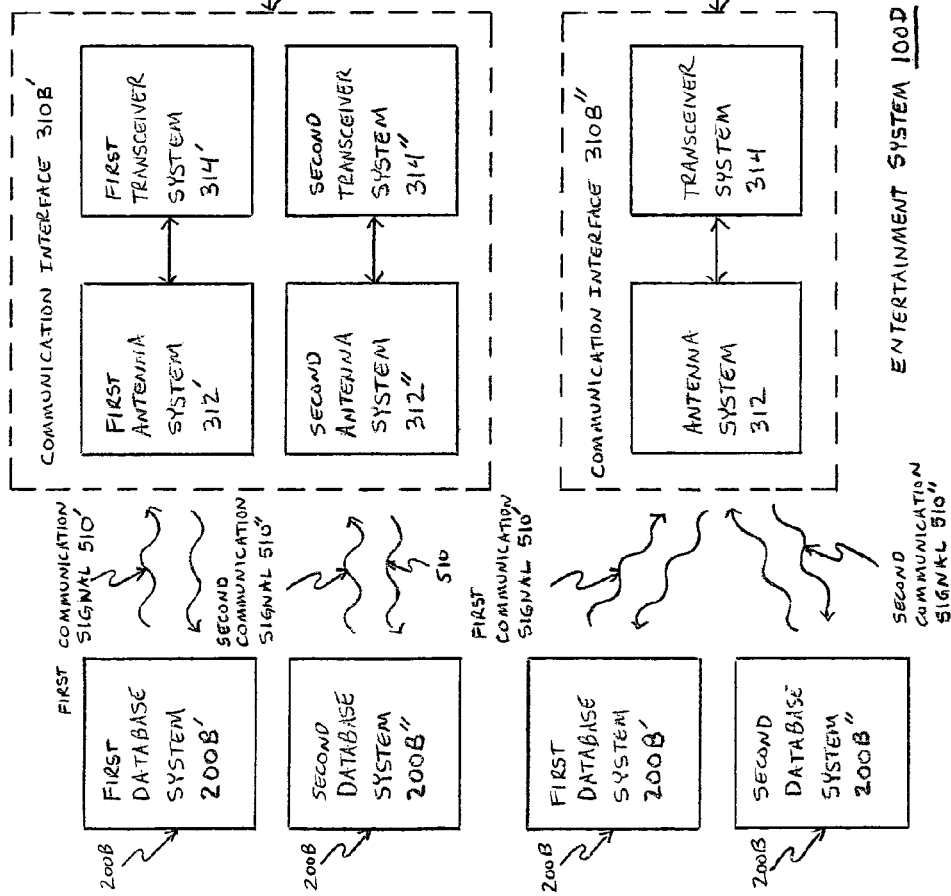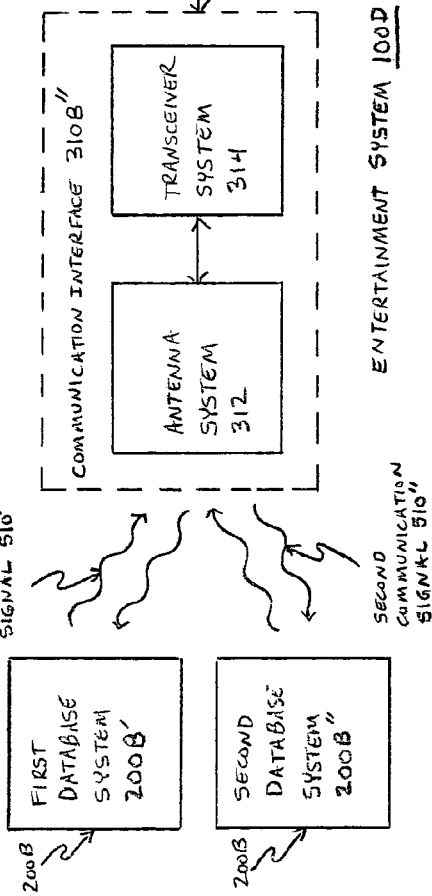

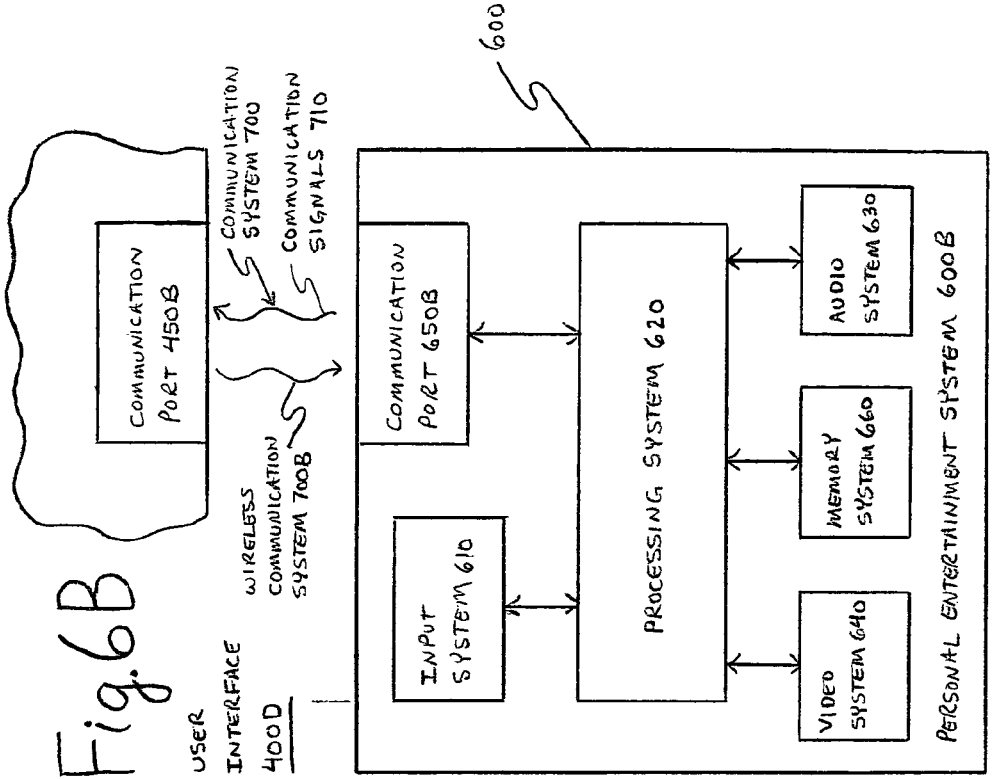
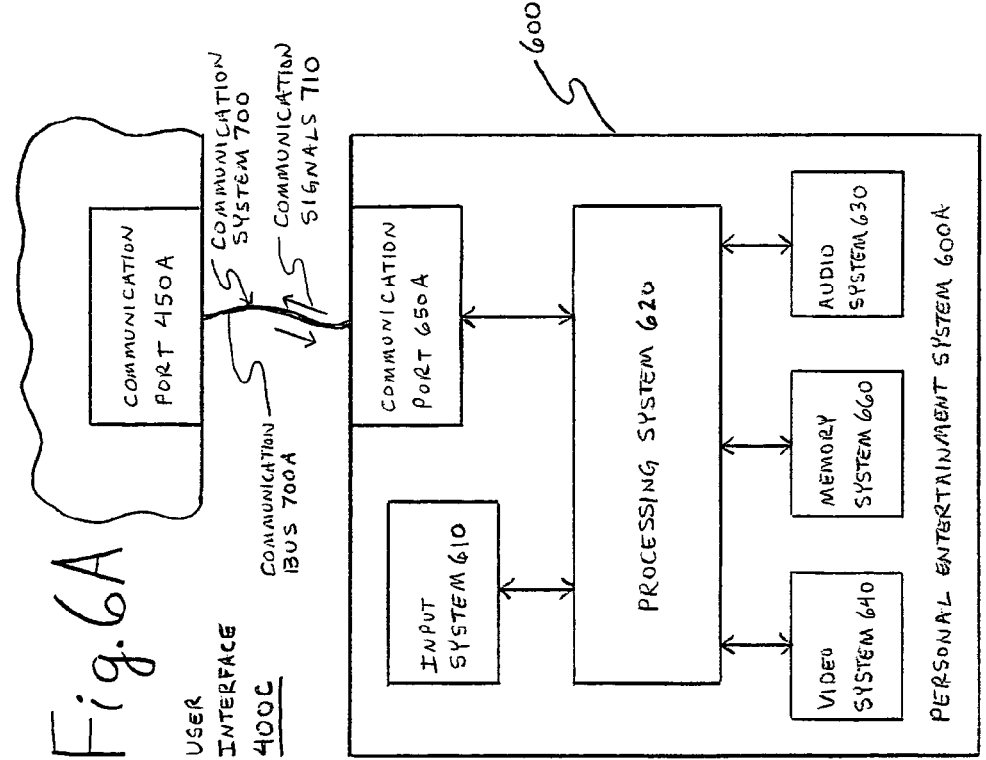

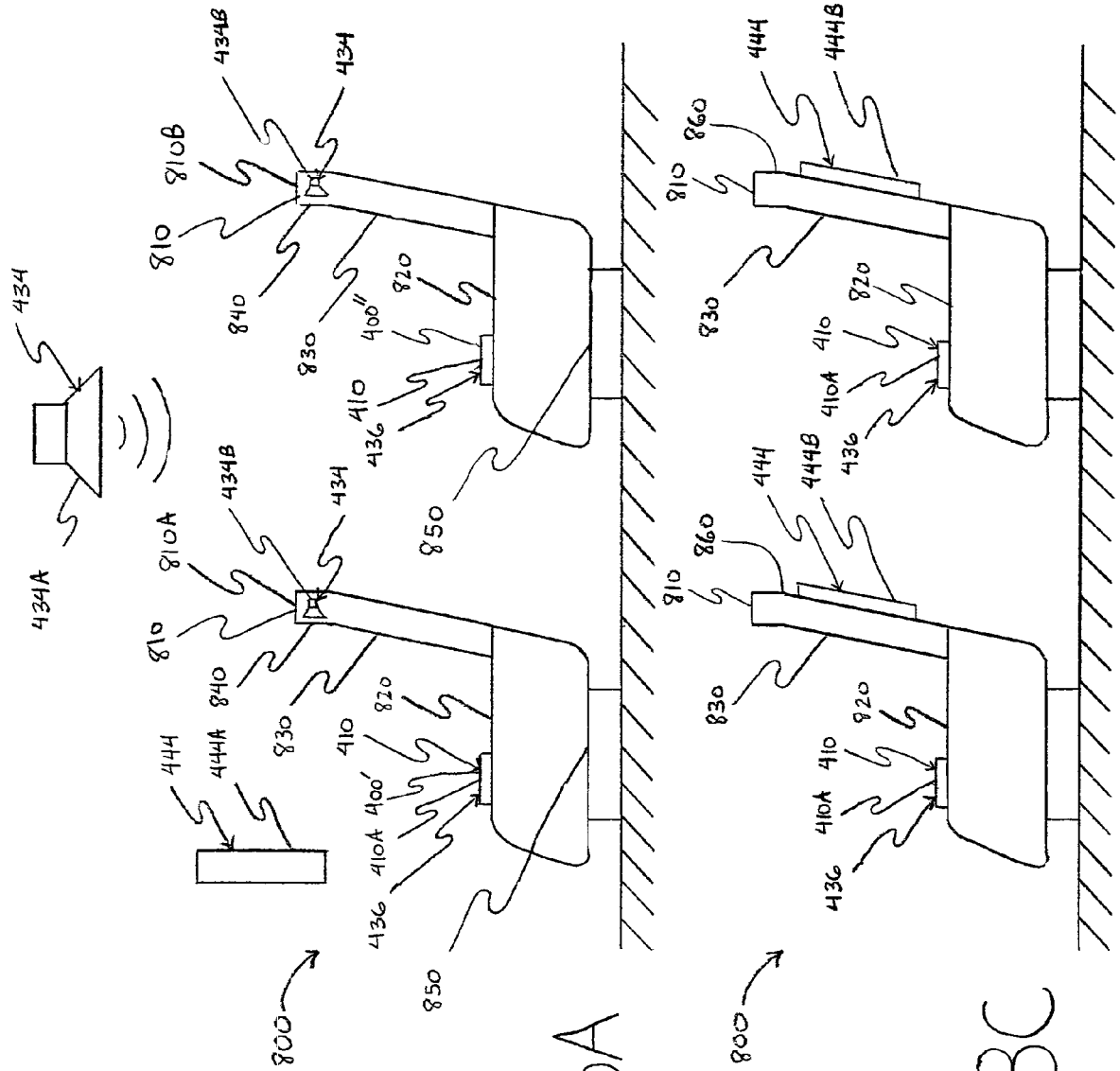

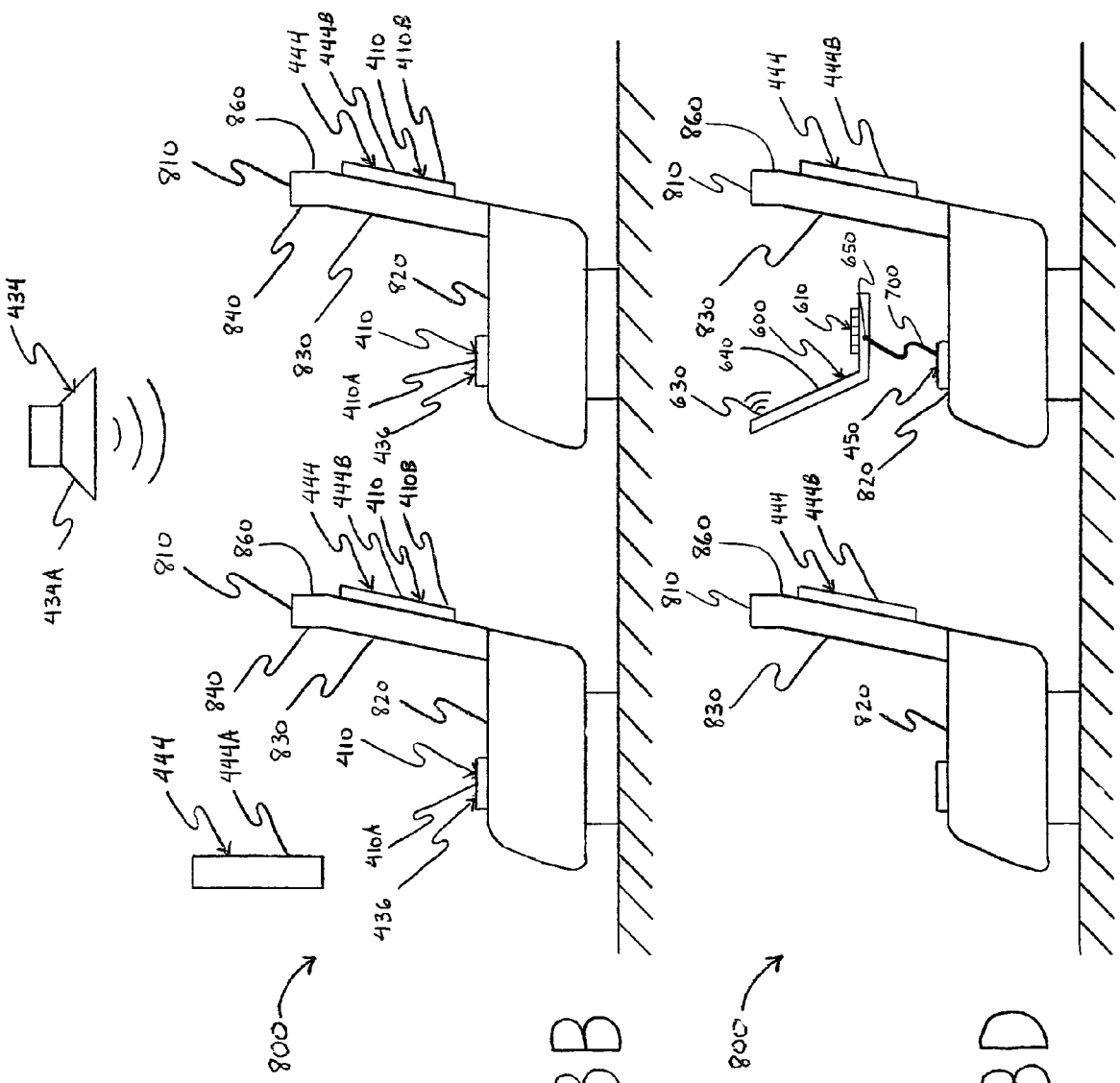

SYSTEM AND METHOD FOR DOWNLOADING FILES

CROSS-REFERENCE TO RELATED APPLICATIONS

This application claims priority to U.S. Provisional Application Ser. No. 60/476,071, filed on Jun. 4, 2003. Priority to the prior application is expressly claimed, and the disclosure of the application is hereby incorporated by reference in its entirety.

FIELD

The present disclosure relates generally to entertainment systems and more particularly, but not exclusively, to passenger entertainment systems for use on aircraft and other types of vehicles.

BACKGROUND

Vehicles, such as automobiles and aircraft, often provide entertainment systems to satisfy passenger demand for entertainment while traveling.

Conventional passenger entertainment systems include overhead cabin viewing systems or seatback viewing systems with individual controls such that viewing content is selectable by the passengers. The viewing content can include audio and video materials that are derived from a variety of sources. Prerecorded viewing content, such as motion pictures and music, can be provided by internal sources, such as audio and video players, that are installed in the vehicle. External content sources can transmit additional content, including live television programming, to the entertainment systems via wireless communication systems.

Since travel schedules can be hectic and unpredictable, passengers often cannot enjoy viewing content in its entirety. Viewing content can be interrupted for numerous reasons during travel. For example, the beginning portions of some live television programming may not be available for viewing because travel departure times do not necessarily correlate with the starting times of the programming. Once travel has been completed, the passengers likewise are required to disembark before the viewing content has been completely presented. Such interruptions of viewing content frequently are a source of passenger complaints.

In view of the foregoing, a need exists for an improved entertainment system that overcomes the aforementioned obstacles and deficiencies of currently-available entertainment systems.

SUMMARY OF THE INVENTION

The present disclosure is directed toward an entertainment system that is configured to download files from one or more database systems and to present the downloaded files regardless of whether communication with the database systems is maintained.

The entertainment system comprises one or more database systems and a mobile entertainment apparatus. Each database system includes at least one file library and is configured to communicate with the entertainment apparatus. When in communication with one or more of the database systems, the entertainment apparatus can select one or more files from the available file libraries and can download the selected files. Once the selected files have been downloaded, the entertainment apparatus is configured to present the files regardless of whether communication with the database systems is maintained.

Preferably comprising a mobile entertainment apparatus, the entertainment apparatus can be provided as a portable, handheld device and/or can be installed in a vehicle, such as an automobile or an aircraft. If the entertainment apparatus is installed in a vehicle, for example, a passenger in the vehicle can download the selected files during travel. The files preferably are stored in a portable personal entertainment system, which is removably coupled with the entertainment apparatus and which can retain the files even if disconnected from the entertainment apparatus. The passenger thereby can view the files at any time, including after disembarking the vehicle once travel is completed, by removing the personal entertainment system from the vehicle.

Other aspects and features of the present disclosure will become apparent from consideration of the following description taken in conjunction with the accompanying drawings.

BRIEF DESCRIPTION OF THE DRAWING

FIG. 2B is an exemplary block diagram illustrating an alternative embodiment of the database system and the entertainment apparatus of FIG. 2A in which the database system and the entertainment apparatus are coupled via a wireless communication system.

FIG. 3A is an exemplary block diagram illustrating one embodiment of an entertainment apparatus for the entertainment system of FIG. 1 in which the entertainment apparatus is configured to communicate with a plurality of database systems.

FIG. 3B is an exemplary block diagram illustrating an alternative embodiment of the entertainment apparatus of FIG. 3A.

FIG. 6A is an exemplary block diagram illustrating one embodiment of the user interface of FIG. 4A in which the user interface includes a personal entertainment system.

FIG. 6B is an exemplary block diagram illustrating an alternative embodiment of the user interface of FIG. 6A.

FIG. 8A is a detail drawing illustrating one embodiment of the user interface of FIGS. 4A-B in which the entertainment apparatus is installed in a vehicle and has an interface video system that includes at least one overhead display system.

FIG. 8B is a detail drawing illustrating an alternative embodiment of the user interface of FIG. 8A in which the interface video system includes a combination of overhead display systems and seatback display systems.

FIG. 8C is a detail drawing illustrating another alternative embodiment of the user interface of FIG. 8A in which the interface video system includes at least one seatback display system.

FIG. 8D is a detail drawing illustrating another alternative embodiment of the user interface of FIG. 8A in which the user interface includes a personal entertainment system.

Figure 1:
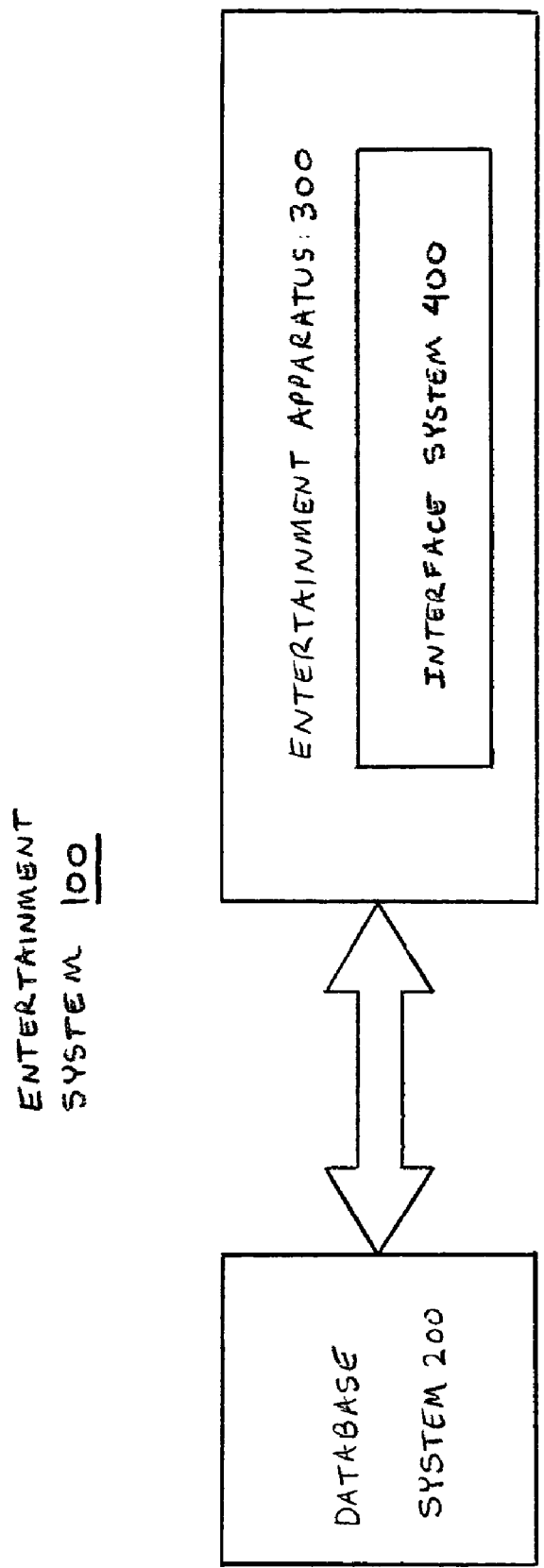
FIG. 1 is an exemplary top-level block diagram of an embodiment of an entertainment system for downloading files.

It should be noted that the figures are not drawn to scale and that elements of similar structures or functions are generally represented by like reference numerals for illustrative purposes throughout the figures. It also should be noted that the figures are only intended to facilitate the description of the preferred embodiments of the present disclosure. The figures do not describe every aspect of the present disclosure and do not limit the scope of the disclosure.

DETAILED DESCRIPTION OF THE PREFERRED EMBODIMENTS

Since currently-available entertainment systems have limited file downloading capabilities, an entertainment system that provides a wide range of downloading capabilities and that permits passengers to retain downloaded files upon disembarking can prove much more desirable and provide a basis for a wide range of entertainment system applications, such as passenger entertainment systems for use on aircraft and other types of vehicles. This result can be achieved, according to one embodiment of the present disclosure, by employing an entertainment system 100 as shown in FIG. 1.

The entertainment system 100 comprises at least one database system 200 each being configured to communicate with a mobile entertainment apparatus 300. Each database system 200 is configured to store and provide one or more file libraries (not shown). Being available for downloading to the entertainment apparatus 300, the file libraries can comprise any suitable type of files and can be provided in any appropriate analog and/or digital file format. Although the file libraries may be provided in any uncompressed format, the file libraries likewise can be provided in a compressed format to facilitate file downloads.

The file libraries, for example, can have entertainment files, including audio files, such as music or audio books, and/or video files, such as motion pictures, television programming, or any other type of audiovisual work. Illustrative file formats for the video files include Audio Video Interleave (AVI) format, Joint Photographic Experts Group (JPEG) format, and Moving Picture Experts Group (MPEG) format; whereas, Waveform (WAV) format and MPEG Audio Layer 3 (MP3) format comprise exemplary formats for the audio files. As desired, other types of files, including application software files, such as media player programs or games, and/or textual files, such as forms or reference materials, can be included in the database system 200. Application software files typically are provided in an executable (EXE) format, and exemplary file formats for the textual files include document text file (DOC) format, Portable Document Format (PDF), and text file (TXT) format.

The entertainment apparatus 300 preferably comprises a mobile entertainment apparatus, being, for example, installed in a vehicle, such as an automobile or an aircraft, and/or provided as a portable, handheld device. When in communication with one or more of the database systems 200, the entertainment apparatus 300 is configured to select one or more files from the available file libraries and to download the selected files, preferably in real-time. Once the selected files have been downloaded, the entertainment apparatus 300 can store the files and can present the files regardless of whether communication with the database systems 200 is maintained.

As illustrated in FIG. 1, the entertainment apparatus 300 can have at least one user interface 400 for selecting the files from the database systems 200 and for controlling the download of the selected files to the entertainment apparatus 300. Presentation of the files likewise can be controllable via the user interface 400. If the entertainment apparatus 300 is installed in a vehicle 800 (shown in FIGS. 7A-B), for example, the user interface 400 preferably includes a personal entertainment system 600 (shown in FIGS. 6A-B) for storing and presenting the files. Being removably coupled with the entertainment apparatus 300, the personal entertainment system 600 can retain the files even if disconnected from the entertainment apparatus 300. Thereby, the files can be downloaded during travel and presented at any time, including after travel is completed, by removing the personal entertainment system 600 from the vehicle 800.

Figure 2A:
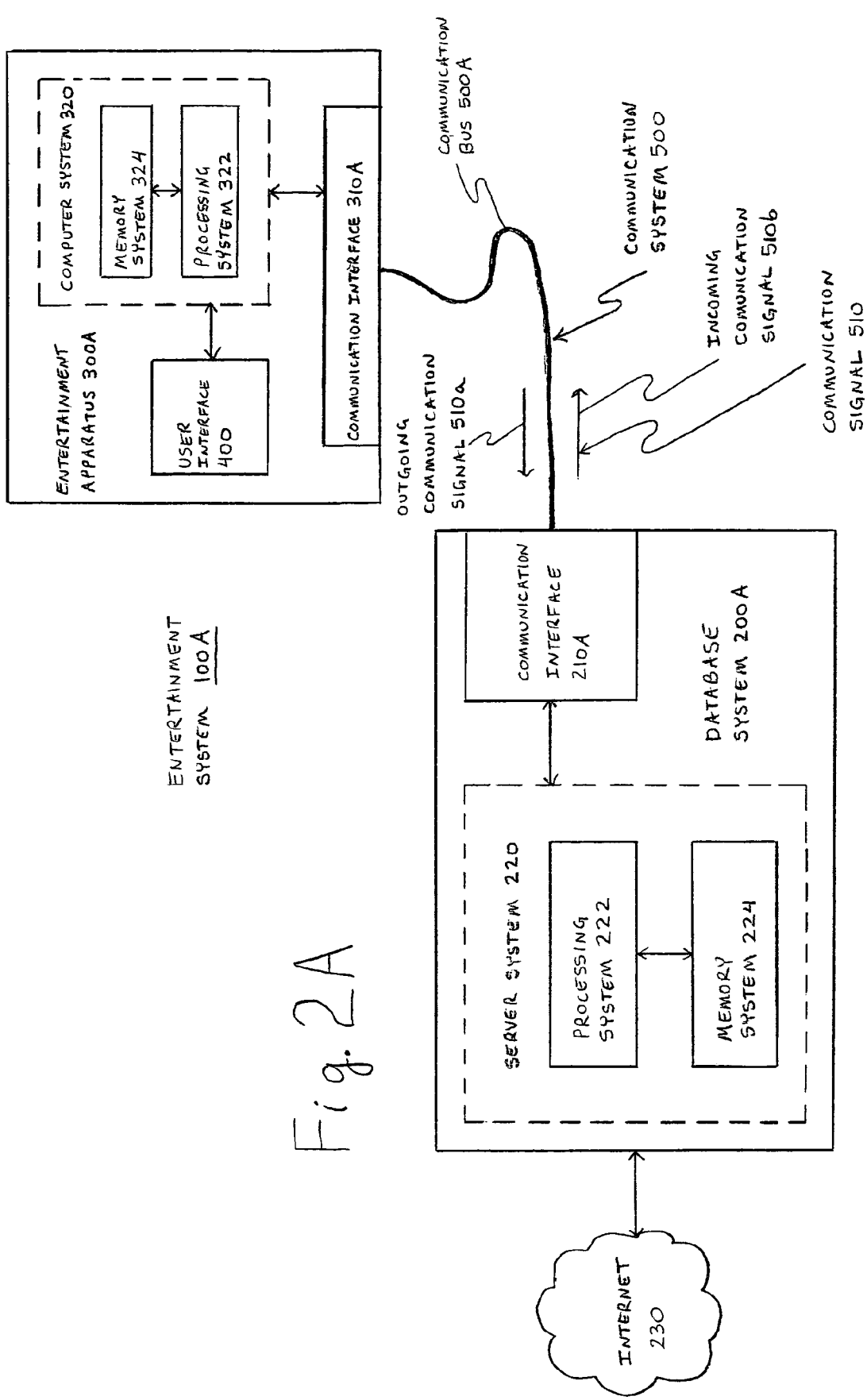
FIG. 2A is an exemplary block diagram illustrating one embodiment of a database system and an entertainment apparatus for the entertainment system of FIG. 1 in which the database system and the entertainment apparatus are coupled via a wired communication system.

The entertainment system 100 can be provided in any suitable manner, such as via one or more hardware components and/or software components. Turning to FIG. 2A, for example, the entertainment system 100A is shown as comprising a database system 200A and an entertainment apparatus 300A. Although shown and described as having one database system 200A and one entertainment apparatus 300A for purposes of illustration, it is understood that the entertainment system 100A can include any number of database systems 200A and entertainment apparatuses 300A. In the manner discussed in more detail above regarding the database system 200 (shown in FIG. 1), the database system 200A is configured to store and provide one or more file libraries (not shown). Each file library can comprise any suitable type of files and is available for downloading to the entertainment apparatus 300A in the manner described above with reference to FIG. 1.

The database system 200A can be configured to communicate with the entertainment apparatus 300A in any suitable manner such that communications signals 510 can be exchanged between the database system 200A and the entertainment apparatus 300A. For example, the database system 200A and the entertainment apparatus 300A can be coupled via a communication system 500, such as communication bus 500A illustrated in FIG. 2A. Comprising a wired communication system, the communication bus 500A can be configured to substantially fixedly and/or removably couple the database system 200A and the entertainment apparatus 300A and can comprise any suitable type of wired communication system, such as one or more communication cables and/or computer networks, including a local area networks (LANs) and/or wide area networks (WANs), of any kind.

The database system 200A can be directly or indirectly coupled with the communication system 500. For example, the database system 200A shown in FIG. 2A is coupled with, and configured to communicate with, the communication system 500 via a communication interface 210A. The communication interface 210A is disposed substantially between the database system 200A and the communication system 500 and is configured to facilitate the exchange of the communications signals 510 between the database system 200A and the communication system 500, and, therefore, the entertainment apparatus 300A. If the communication system 500 comprises a telephone network (not shown), for example, the communication interface 210A can comprise a modem for coupling the database system 200A with the telephone network. Although shown and described as being disposed substantially within the database system 200A, the communication interface 210A can be disposed substantially within, or separate from, the database system 200A.

The communication signals 510 exchanged between the database system 200A and the entertainment apparatus 300A can comprise any suitable type of communication signals and include one or more outgoing communication signals 510a and/or incoming signals 510b. The entertainment apparatus 300A is configured to transmit the outgoing communication signals 510a to the database system 200A. Illustrative types of outgoing communication signals 510a include instructions and queries. Instructions for selecting one or more files from the file libraries and instructions for controlling the download of the selected files to the entertainment apparatus 300 are exemplary instructions. Typical queries include queries to verify that the entertainment apparatus 300A can communicate with the database system 200A and/or queries to ascertain system information, such as an operational status and/or file library content, concerning the database system 200A.

The entertainment apparatus 300A likewise can provide various types of information to the database system 200A via the outgoing communication signals 510a. The information typically is provided by the entertainment apparatus 300A in response to an information request, such as an instruction and/or a query, from the database system 200A. As desired, the entertainment apparatus 300A can be configured to automatically provide the information when communications with the database system 200A are initiated, for example, to negotiate a communication connection between the entertainment apparatus 300A and the database system 200A. The provided information can include system information, such as an operational status and/or available memory, for the entertainment apparatus 300A. Transaction information, including payment information, such as a credit card number, and/or authorization information, such as a personal identification number (PIN) or a password, can be provided by the entertainment apparatus 300A. It will be appreciated that the entertainment apparatus 300A can transmit other types of information to the database system 200A, as desired.

Similarly, the database system 200A is configured to transmit the incoming communication signals 510b to the entertainment apparatus 300A. Like the outgoing communication signals 510a described above, the incoming communication signals 510b can include one or more instructions, queries, and/or other types of information. Illustrative queries include queries to verify that the database system 200A can communicate with the entertainment apparatus 300A and/or queries to ascertain the system information for the entertainment apparatus 300A.

In the manner described above with reference to the entertainment apparatus 300A, the database system 200A can provide various types of information to the entertainment apparatus 300A via the incoming communication signals 510b. The database system 200A can provide the information in response to a request, such as an instruction and/or a query, from the entertainment apparatus 300A and/or automatically upon initiation of communications with the entertainment apparatus 300A. The information can include the system information for the database system 200A, one or more library files selected for download, and/or a catalog of the file libraries available on the database system 200A. The catalog can provide information, such as a title, a file size, a download fee, a content description, a content rating, and parental labeling guideline requirements, about the files in the available file libraries. If a download fee is associated with a preselected file, the information can indicate whether a sample portion of the preselected file can be downloaded for free such that the content of the file can be previewed prior to purchase.

The database system 200A preferably is configured to require authorization prior to permitting access to the library files. The database system 200A, for example, can condition library file access upon receipt of valid authorization information and/or transaction information from the entertainment apparatus 300A. As desired, the database system 200A can process the transaction information by calculating the total download fees and/or by processing the payment information. The database system 200A likewise can generate a transaction report, which can be downloadable from the database system 200A and/or forwarded to a billing address associated with the transaction information.

If the entertainment system 100A is configured to permit the entertainment apparatus 300A to upload files to the database system 200A, the outgoing communication signals 510a can comprise one or more files to be uploaded as well as file information about the files. For example, the file information can include information, such as a title, a file size, a content description, and a content rating, about the files and can be utilized to facilitate storing the uploaded files in the appropriate file libraries of the database system 200A. The database system 200A likewise can provide incoming communication signals 510b to the entertainment apparatus 300A, which incoming signals 510b comprise information related to the status of the database system 200A to upload the files. The information can include the operational status and/or available memory, with regard to the database system 200A. To inhibit files with inappropriate content from being stored in the file libraries, the database system 200A can provide information about acceptable content ratings to the entertainment apparatus 300A and/or inhibit the entertainment apparatus 300A from uploading files with inappropriate content.

As illustrated in FIG. 2A, the database system 200A includes a server system 220 for storing the file libraries and for providing selected file libraries to the entertainment apparatus 300A. Comprising a processing system 222 and a memory system 224, the server system 200 can be provided as any type of server system. The server system 200 typically includes one or more computer systems, such as personal computer systems, which are coupled, and configured to communicate, via as a computer network, such as a local area network (LAN) and/or a wide area network (WAN), of any kind. Preferably, the server system 200 is configured to communicate with the Internet 230 such that the database system 200A can provide content, including file libraries from third-party content providers, from the Internet 230. The server system 200 can be configured to permit content to be added to, modified, and/or deleted from the file libraries, as desired.

The memory system 224 is configured to store and provide at least a portion of the file libraries. The memory system 224 likewise can store and provide other types of information, including instruction code, such as software or firmware, intermediate calculation results, and other information associated with the processing system 222 and/or performance data related to the current and/or historical operational status of the database system 200A. Preferably comprising a non-volatile memory system, the memory system 224 can comprise any suitable type of memory system, such as any electronic, magnetic, and/or optical storage media, without limitation. For example, exemplary storage media can include one or more static random access memories (SRAMs), dynamic random access memories (DRAMs), electrically-erasable programmable read-only memories (EEPROMs), FLASH memories, hard drives (HDDs), compact disks (CDs), and/or digital video disks (DVDs) of any kind.

If the entertainment system 100A comprises a portable, handheld system with the database system 200A and the entertainment apparatus 300A disposed within a common housing (not shown), for example, the memory system 224 preferably comprises electronic memory media because the handheld system should have a small size and a light weight. In contrast, the memory system 224 can include one or more mechanical and/or optical media if the entertainment system 100A is installed in a vehicle, such as an automobile, with mechanical and/or optical media being located in a storage space, such as the trunk, of the vehicle.

Being coupled with, and configured to communicate with, the memory system 224, the processing system 222 can comprise any type of processing system, such as one or more microprocessors (μPs), central processing units (CPUs) and/or digital signal processors (DSPs) of any kind. The processing system 222 is configured to receive the outgoing communication signals 510*a* provided by the entertainment apparatus 300A and to perform one or more functions, as necessary, in response to the outgoing communication signals 510*a*. The processing system 222 can provide the result of the functions to the memory system 224 and/or the entertainment apparatus 300A, as desired. For example, upon receiving an instruction from the entertainment apparatus 300A to select one or more files from the file libraries for downloading, the processing system 222 can execute an appropriate instruction set from the memory system 224. The processing system 222 thereby can identify the selected files in the memory system 224 and provide the selected files to the entertainment apparatus 300A via the communication system 500.

The entertainment apparatus 300A can be coupled with, and configured to communicate with, the communication system 500 directly or indirectly via one or more intermediate systems, such as a communication interface 310A as illustrated in FIG. 2A. The communication interface 310A preferably is provided substantially in the manner discussed in m ore detail above with reference to the communication interface 210A. Being disposed substantially between the entertainment apparatus 300A and the communication system 500, the communication interface 310A is configured to facilitate the exchange of communications signals 510 between the entertainment apparatus 300A and the communication system 500, and, therefore, the database system 200A. Although the communication interface 310A is shown and described as being disposed substantially within the entertainment apparatus 300A, the communication interface 310A can be separate from the entertainment apparatus 300A.

The entertainment apparatus 300A has at least one user interface 400 for selecting the files from the database systems 200A and for controlling the download of the selected files to the entertainment apparatus 300A. The user interface 400 can be coupled with, and configured to communicate with, the communication interface 310A and/or the communication system 500 directly or indirectly via one or more intermediate systems. For example, the entertainment apparatus 300A is illustrated in FIG. 2A as being provided with an computer system 320 that couples the user interface 400 and the communication interface 310A. Although the computer system 320 is shown and described as being substantially separate from the user interface 400, it will be appreciated that the computer system 320 can be disposed substantially within the user interface 400.

The computer system 320 is configured to receive and process instructions provided by the user interface 400 and/or the incoming communication signals 510*b* provided by the database system 200A and to provide the outgoing communication signals 510*a*. Similarly, the incoming communication signals 510*b* from the database system 200A can be received and processed by the computer system 320. The computer system 320 can process the incoming communication signals 510*b* based at least in part on the instructions provided by the user interface 400. As desired, the computer system 320 can provide the incoming communication signals 510*b*, such as the incoming communication signals 510*b* that include downloaded files, to the user interface 400 for presentation.

As shown in FIG. 2A, the computer system 320 can include a processing system 322 that is coupled with, and configured to communicate with, a memory system 324. Comprising any suitable type of processing system in the manner described in more detail above with reference to the processing system 222, the processing system 322 is configured to perform one or more functions, as necessary, on the instructions from the user interface 400 and/or the incoming communication signals 510*b* provided by the database system 200A. In the manner discussed above, the processing system 322 can perform the functions by receiving and executing a series of instructions, which can be provided in the form of instruction code that is stored in, and provided by, the memory system 324. The processing system 322 can provide the result of the functions to the user interface 400, the memory system 324, and/or the database system 200A, as desired. For example, the processing system 322 can provide the outgoing communication signals 510*a* to the database system 200A.

The memory system 324 is configured to store the selected files downloaded from the database system 200A and to provide the files to the user interface 400 for presentation. In the manner described in more detail above with reference to the memory system 224, the memory system 324 can store and provide other types of information, including instruction code and other information associated with the processing system 322 and/or performance data related to the current and/or historical operational status of the entertainment apparatus 300A. Preferably comprising a non-volatile memory system, the memory system 324 can comprise any suitable type of memory system, including any electronic, magnetic, and/or optical storage mediums in the manner described above regarding the memory system 224. The user interface 400 preferably is configured to permit files to be added to, modified, and/or deleted from the memory system 324.

As will be described in more detail below with reference to FIGS. 4A-B, each user interface 400 is configured to permit a user (not shown) to interact with the entertainment system 100A and includes an input system 410 (shown in FIG. 4A), an interface audio system 430 (shown in FIG. 4A), and/or an interface video system 440 (shown in FIG. 4A). The input system 410 permits the user to communicate the instructions, such as instructions for selecting one or more files from the available file libraries and/or instructions for controlling the presentation of the selected file, to the entertainment apparatus 300A. The interface audio system 430 and the interface video system 440 are respectively configured to present an audio portion and a video portion of the downloaded files. Other information, such as a menu of file libraries available for downloading, can be presented to the user via the interface system 400.

Turning to FIG. 2B, the exemplary entertainment system 100B includes a database system 200B that is configured to communicate with an entertainment apparatus 300B. Although shown and described as having one database system 200B and one entertainment apparatus 300B for purposes of illustration, it is understood that the entertainment system 100B can include any number of database systems 200B and entertainment apparatuses 300B. In the manner described above, the database system 200B is configured to store and provide one or more file libraries (not shown), and each file library can comprise any suitable type of files and is available for downloading to the entertainment apparatus 300B.

The database system 200B and the entertainment apparatus 300B can be coupled via a wireless communication system 500, such as the satellite system 500B illustrated in FIG. 2B. The satellite system 500B can comprise any number of geostationary satellites (not shown), which are configured to communicate with a terrestrial station (not shown). When the database system 200B and the entertainment apparatus 300B each are within transmission range of at least one of the satellites, communications signals 510 can be exchanged between the database system 200B and the entertainment apparatus 300B via the satellite system 500B. Although shown and described as a satellite system 500B for purposes of illustration, it is understood that the wireless communication system 500 can comprise any suitable type of wireless communication system, such as a cellular communication system (not shown).

In the manner discussed above with regard to the database system 200A (shown in FIG. 2A), the database system 200B comprises a server system 220 for storing the file libraries and for providing selected file libraries to the entertainment apparatus 300B. The server system 220 is configured to receive and process outgoing communication signals 510a provided by the entertainment apparatus 300B and to provide incoming communication signals 510b the manner discussed above with reference to FIG. 2A. The database system 200B preferably is configured to communicate with, and provide content from, the Internet 230 and to permit content to be added to, modified, and/or deleted from the file libraries. The database system 200B is shown as being provided with a communication interface 210B for facilitating the exchange of the communications signals 510 between the database system 200B and the entertainment apparatus 300B. Although shown and described as being disposed substantially within the database system 200B, the communication interface 210B can be disposed substantially within, or separate from, the database system 200B.

Being disposed substantially between the database system 200B and the satellite system 500B, the communication interface 210B includes an antenna system 212 that is coupled with, and configured to communicate with, a transceiver system 214. The antenna system 212 and the transceiver system 214 each can be provided in any suitable manner. Preferably having one or more antenna elements (not shown), the antenna system 212 is configured to receive the outgoing communication signals 510b from the entertainment apparatus 300B via the satellite system 500B. The antenna system 212 provides the outgoing communication signals 510b to the transceiver system 214, which can be configured to process the outgoing communication signals 510b as desired. Illustrative processes include decoding, demodulating, and/or analog-to-digital converting the outgoing communication signals 510b. Upon processing the outgoing communication signals 510b, the transceiver system 214 provides the processed outgoing communication signals 510b to the server system 220.

The antenna system 212 likewise can transmit the incoming communication signals 510a provided by the database system 200B. The server system 220 provides the incoming communication signals 510a to the transceiver system 214, which is configured to process the incoming communication signals 510a. For example, the transceiver system 214 can encode, modulate, and/or analog-to-digital convert the incoming communication signals 510a as desired. The transceiver system 214 provides the processed incoming communication signals 510a to the antenna system 212 for transmission to the satellite system 500B. When the communication signals 510 are exchanged, the antenna system 212 is directed substantially toward one or more of the satellites in the satellite system 500B. The antenna system 212 preferably is coupled with an antenna controller (not shown) for steering the antenna system 212 such that the antenna system 212 can track the satellites in any known manner such as by locking onto the outgoing communication signals 510b transmitted by the satellite system 500B.

Although shown and described as comprising the database system 200A in FIG. 2A and the database system 200B in FIG. 2B for purposes of illustration, it is understood that the database system 200 (shown in FIG. 1) can comprise any type of database system and is not limited to the illustrated embodiments. For example, the database system 220B can be substantially integrated with the satellite system 500B. Stated somewhat differently, the database system 220B can be disposed substantially within one or more of the geostationary satellites and/or the terrestrial station that form the satellite system 500B. If the database system 220B is disposed substantially within the geostationary satellites, the communication signals 510, and therefore the selected files, can be directly downloaded from the satellite system 500B to the entertainment apparatus 300B.

Turning to the entertainment apparatus 300B, the entertainment apparatus 300B has a computer system 320 and at least one user interface 400, each being provided in the manner discussed above regarding the entertainment apparatus 300A (shown in FIG. 2A). In the manner described above, the computer system 320 is configured to receive and process instructions provided by the user interface 400 and/or the incoming communication signals 510b provided by the database system 200A and to provide the outgoing communication signals 510a; whereas, the user interface 400 is configured to permit a user (not shown) to interact with the entertainment system 100B. The entertainment apparatus 300B is shown as being provided with a communication interface 310B for facilitating the exchange of the communications signals 510 between the database system 200B and the entertainment apparatus 300B. Although shown and described as being disposed substantially within the entertainment apparatus 300B, the communication interface 310B can be disposed substantially within, or separate from, the entertainment apparatus 300B.

The communication interface 310B is disposed substantially between the entertainment apparatus 300B and the satellite system 500B. Preferably being provided substantially in the manner discussed above with reference to the communication interface 310A, the communication interface 310B comprises an antenna system 312 that is coupled with, and configured to communicate with, a transceiver system 314. The antenna system 312 is configured to receive incoming communication signals 510a from the database system 200B via the satellite system 500B and provides the incoming communication signals 510a to the transceiver system 314, which can be configured to process the incoming communication signals 510a. The transceiver system 314, for example, can decode, demodulate, and/or analog-to-digital convert the incoming communication signals 510a as desired. Upon processing the incoming communication signals 510a, the transceiver system 314 provides the processed incoming communication signals 510a to the computer system 320.

The outgoing communication signals 510b provided by the computer system 320 likewise can be transmitted by the antenna system 312 to the database system 200B via the satellite system 500B. The computer system 320 provides the outgoing communication signals 510b to the transceiver system 314, which processes the outgoing communication signals 510b. Exemplary processes can include encoding, modulating, and/or analog-to-digital converting the outgoing communication signals 510b as desired. The transceiver system 314 can provide the processed outgoing communication signals 510b to the antenna system 312 for transmission to the satellite system 500B. When the communication signals 510 are exchanged, the antenna system 312 is directed substantially toward one or more of the satellites in the satellite system 500B. Since the entertainment apparatus is mobile, the antenna system 312 preferably is coupled with an antenna controller (not shown) for steering the antenna system 312 such that the antenna system 312 can track the satellites in any known manner such as by locking onto the incoming communication signals 510a transmitted by the satellite system 500B. Although the entertainment apparatus 300 is shown as comprising the entertainment apparatus 300A in FIG. 2A and the entertainment apparatus 300B in FIG. 2B for purposes of illustration, it is understood that the entertainment apparatus 300 (shown in FIG. 1) can comprise any type of entertainment apparatus and is not limited to the illustrated embodiments.

It will be appreciated that the entertainment system 100 of FIG. 1 can communicate with a plurality of database systems 200, which can be provided in any suitable combination and/or configuration. As illustrated in FIGS. 3A-B, for example, the entertainment systems 100C, 100D includes an entertainment apparatuses 300C, 300D that can be configured to be in wired communication with one or more database systems 200A and/or wireless communication with one or more database systems 200B. Turning to FIG. 3A, the entertainment system 100C, includes the entertainment apparatus 300C that is configured to communication with a database system 200A, a first database system 200B', and a second database system 200B". Being provided in the manner described above with reference to FIGS. 2A-B, each of the database systems 200A, 200B', and 200B" is configured to store and provide one or more file libraries (not shown).

The entertainment apparatus 300C includes a computer system 320 and at least one user interface 400, each being provided in the manner discussed above regarding the entertainment apparatus 300A (shown in FIG. 2A). In the manner described above, the computer system 320 is configured to receive and process instructions provided by the user interface 400 and/or communication signals 510 provided by one or more of the database systems 200A, 200B', and 200B" and to provide communication signals 510 to the database systems 200A, 200B', and 200B". As shown in FIG. 3A, the database systems 200A, 200B', and 200B" can be coupled with the computer system 320 substantially in a star arrangement. The user interface 400 is configured to permit a user (not shown) to interact with the entertainment system 100C. The entertainment apparatus 300C can be in communication with any combination of the database systems 200A, 200B', and 200B", depending, for example, upon the availability of each database systems 200A, 200B', and 200B".

The entertainment apparatus 300C can include a communication interface 310B' for facilitating the exchange of the communications signals 510 between the database systems 200B', 200B" and the entertainment apparatus 300C. As shown in FIG. 3A, the communication interface 310B' includes a first antenna system 312', which is coupled with, and configured to communicate with, a first transceiver system 314', and a second antenna system 312", which is coupled with, and configured to communicate with, a second transceiver system 314". The first and second antenna systems 312', 312" each are provided in the manner described above with reference to the antenna system 312 (shown in FIG. 2B); whereas, the first and second transceiver systems 314', 314" can be provided in the manner described above regarding the transceiver system 314 (shown in FIG. 2B). As shown in FIG. 3A, the communication interface 310B' comprises a substantially separate communication interface for each database systems 200B', 200B". Stated somewhat differently, the first antenna system 312' and the first transceiver system 314' are configured to exchange first communication signals 510' between the first database system 200B' and the entertainment apparatus 300C; whereas, the second antenna system 312" and the second transceiver system 314" are configured to exchange second communication signals 510" between the second database system 200B" and the entertainment apparatus 300C.

In the manner set forth above with reference to the communication interface 310B (shown in FIG. 2B), the first antenna system 312' is configured to receive first communication signals 510' from the first database system 200B'. The first antenna system 312' provides the first communication signals 510' to the first transceiver system 314', which processes the first communication signals 510' and provides the processed first communication signals 510' to the computer system 320. The first communication signals 510' provided by the computer system 320 likewise can be processed by the first transceiver system 314' and transmitted by the first antenna system 312' to the first database system 200B'.

Similarly, the second antenna system 312' is configured to receive second communication signals 510" from the second database system 200B" and to provide the second communication signals 510" to the second transceiver system 314". Upon processing the second communication signals 510", the second transceiver system 314" can provide the processed second communication signals 510" to the computer system 320. The second communication signals 510" provided by the computer system 320 can be processed by the second transceiver system 314" and transmitted by the second antenna system 312" to the second database system 200B". Thereby, the computer system 320 can be configured to communicate with each of the database systems 200A, 200B', and 200B".

Like the entertainment system 100C, the entertainment system 100D is shown in FIG. 3B as comprising the entertainment apparatus 300D, a database system 200A, a first database system 200B', and a second database system 200B". The entertainment apparatus 300D is configured to be in wired communication with the database system 200A and in wireless communication with the first and second database systems 200B', 200B". The database systems 200A, 200B', and 200B" each is provided in the manner described above with reference to FIG. 3A and is configured to store and provide one or more file libraries (not shown).

Being provided in the manner described with reference to FIG. 3A, the entertainment apparatus 300C includes a computer system 320 and at least one user interface 400. In the manner described above, the computer system 320 is configured to receive and process instructions provided by the user interface 400 and/or communication signals 510 provided by one or more of the database systems 200A, 200B', and 200B" and to provide communication signals 510 to the database systems 200A, 200B', and 200B". As shown in FIG. 3A, the database systems 200A, 200B', and 200B" can be coupled with the computer system 320 substantially in a daisy-chain, or series, arrangement whereby files downloaded from the first and second database systems 200B', 200B" are provided to the database system 200A. The database system 200A thereby is configured to store a copy, such as an archival copy, of the files downloaded from the first and second database systems 200B', 200B". The user interface 400 is configured to permit a user (not shown) to interact with the entertainment system 100C. The entertainment apparatus 300C can be in communication with any combination of the database systems 200A, 200B', and 200B", depending, for example, upon the availability of each database systems 200A, 200B', and 200B".

The entertainment apparatus 300D can be provided with a communication interface 310B" for facilitating the exchange of the communications signals 510 with the database systems 200B', 200B". As shown in FIG. 3B, the communication interface 310B" includes an antenna system 312, which is coupled with, and configured to communicate with, a transceiver system 314. The antenna system 312 and the transceiver system 314 are respectively provided in the manners described above with reference to the antenna system 312 (shown in FIG. 2B) and the transceiver system 314 (shown in FIG. 2B). As shown in FIG. 3B, the communication interface 310B" comprises an integrated communication interface for coupling the entertainment apparatus 300D with the database systems 200B', 200B".

In the manner described above, the antenna system 312 is configured to receive first communication signals 510' from the first database system 200B' and/or second communication signals 510" from the second database system 200B". The antenna system 312 provides the received communication signals 510', 510" to the transceiver system 314. The transceiver system 314 processes the communication signals 510', 510" and provides the processed communication signals 510', 510" to the computer system 320. The communication signals 510', 510" provided by the computer system 320 likewise can be processed by the transceiver system 314 and transmitted by the antenna system 312 to the respective database systems 200B', 200B".

Figure 4A:
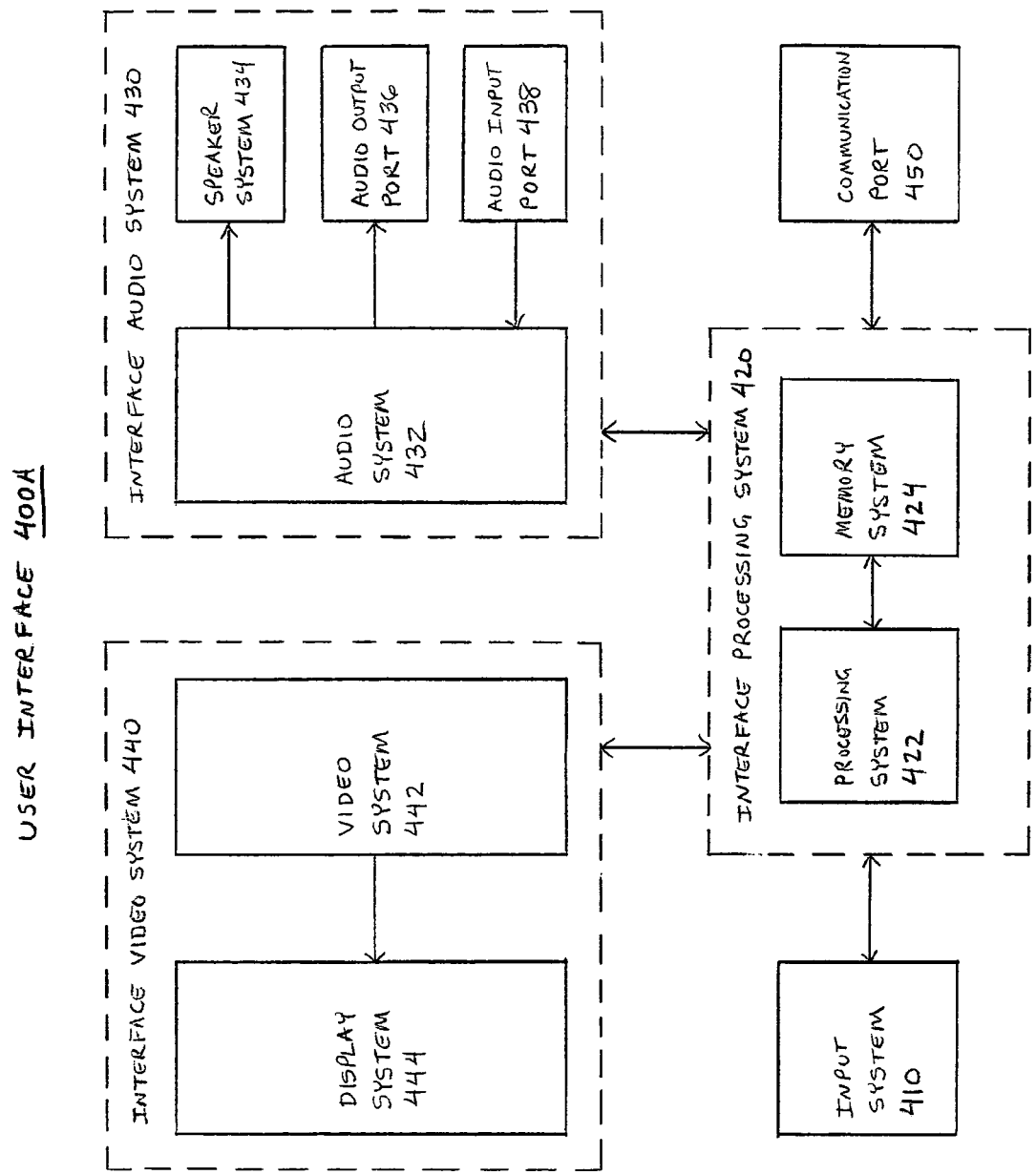
FIG. 4A is an exemplary block diagram illustrating one embodiment of a user interface for the entertainment system of FIG. 1.
Figure 4B:
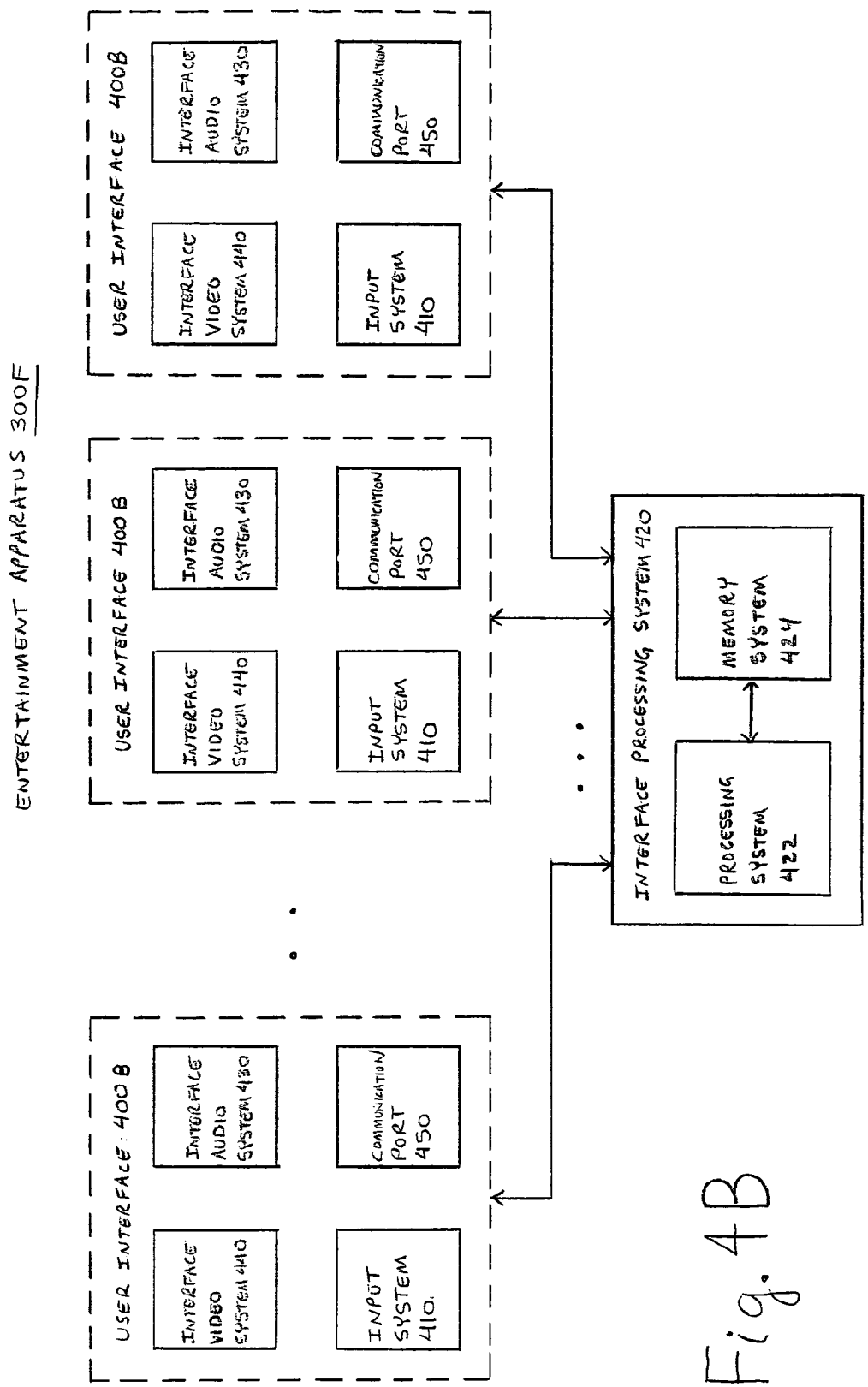
FIG. 4B is an exemplary block diagram illustrating an alternative embodiment of the user interface of FIG. 4A.

FIG. 4A illustrates the details of one embodiment of the user interface 400 for the entertainment system 100 of FIG. 1. The exemplary user interface 400A is configured to permit a user (not shown) to communicate and otherwise interact with the entertainment system 100 and includes an input system 410 and an output system (not shown). The output system can comprise an interface audio system 430 and/or an interface video system 440. The user interface 400A can be integrated into, and/or separable from, the entertainment apparatus 300 (shown in FIG. 1).

The input system 410 permits the user to communicate instructions, such as instructions for selecting one or more files from the available file libraries and/or instructions for controlling the presentation of the selected file, to the entertainment apparatus 300. Typically comprising one or more pushbuttons (not shown), such as a keyboard or a keypad, and/or a pointing device (not shown), such as a mouse or trackball, the input system 410 can be provided in any suitable manner. As desired, the input system 410 can be combined with one or more other systems of the user interface 400A. The input system 410 and the interface video system 440, for example, can be combined in the form of a touch screen. Further, if a fee is required for downloading and/or presenting files via the entertainment system 100, the input system 410 can include a credit card reader; otherwise, the user can provide his payment information via the keyboard and/or pointing device.

The entertainment apparatus 300 is configured to communicate with the user via the interface audio system 430 and/or the interface video system 440. The interface audio system 430 can audibly present information to the user; whereas, the interface video system 440 can present information to the user visually. The interface system 400A can be configured to present any type of information, including instructions for using the entertainment system 100, a catalog of file libraries available for download, and any downloaded files. For example, the interface video system 440 can provide a graphical user interface (GUI) to facilitate interaction with the entertainment system 100 and/or an interactive menu of the available file libraries, including files available for downloading and/or files previously downloaded to the interface system 400A. The interface system 400A thereby can assist the user in selecting one or more files to be presented via the entertainment apparatus 300.

Once the user has made his selection and, as necessary, entered his payment and/or authorization information, the entertainment apparatus 300 can download the selected files. The interface audio system 430 and the interface video system 440 are respectively configured to present an audio portion and a video portion of the files. As desired, the entertainment apparatus 300 can provide additional functionality for controlling the presentation of the files. For example, the input system 410 can be configured to rewind, fast forward, and/or pause the presentation the files. The input system 410 likewise can include a volume control, mixing, equalization, and/or muting functions and/or can perform general file management functions, such as transferring and/or deleting one or more of the files and can provide a file directory to facilitate organization of the files. As desired, the input system 410 can provide file editing functionality.

As shown in FIG. 4A, the interface audio system 430 includes an audio system 432 that is coupled with, and configured to communicate with, a speaker system 434 and one or more audio communication ports. The audio communication ports can include one or more audio output ports 436, audio input ports 438, and/or microphone ports (not shown). Being configured to receive the audio portion of the selected file, the audio system 432 can include one or more coder/decoders (CODECs), amplifiers, analog-to-digital converters (ADCs), mixers, and/or equalizers for processing the audio portion. The processed audio portion of the selected file can be audibly presented via the speaker system 434 and/or a secondary speaker system (not show), such as a set of head phones, that is coupled with the audio output port 436. Preferably, the manner by which the audio portion is processed and/or audibly presented is controllably via the input system 410.

The interface video system 440 is illustrated in FIG. 4A as comprising a video system 442 that is coupled with, and configured to communicate with, a display system 444. The video system 442 can receive and process the video portion of the selected file, which processed video portion is visually presented via the display system 444. The display system 444 can be configured to visually present graphical information and/or textual information. The manner by which the video portion of the selected file is processed and/or visually presented preferably is controllably via the input system 410. Although preferably visually presented as a digital image, the visual portion can be converted by the video system 442 to an analog image that can be presented by the display system 444.

The interface audio system 430 and the interface video system 440 are coupled with, and configured to communicate with the input system 410 via an interface processing system 420. The interface processing system 420 is configured to receive and process instructions provided by the input system 410 and/or the incoming communication signals 510$b$ (shown in FIGS. 2A-B) provided by a database system 200 (shown in FIG. 1) and to provide the outgoing communication signals 510a (shown in FIGS. 2A-B) to the database system 200. For example, the processes performed by the interface processing system 420 on the outgoing communication signals 510b can include encoding, modulating, and/or analog-to-digital converting the outgoing communication signals 510b; whereas, the incoming communication signals 510a can be decoded, demodulated, and/or digital-to-analog converted by the interface processing system 420. Being provided in the manner described in more detail above with reference to the computer system 320 (shown in FIGS. 2A-B), the interface processing system 420 includes a processing system 422 and a memory system 424 and can be substantially integrated with, or separate from, the computer system 320.

The memory system 424 is coupled with, and configured to communicate with, the processing system 422 and is configured to receive and store the selected files downloaded from the database system 200 and, under the control of the input system 410, to provide the files to the interface audio system 430 and/or the interface video system 440 for presentation. In the manner described in more detail above with reference to the memory system 324 (shown in FIG. 2A), the memory system 424 can store and provide other types of information, including instruction code and other information associated with the processing system 422 and/or performance data related to the current and/or historical operational status of the user interface 400A. Preferably comprising a non-volatile memory system, the memory system 424 can comprise any suitable type of memory system, including any electronic, magnetic, and/or optical storage mediums in the manner described above regarding the memory system 324. The input system 410 preferably is configured to permit files to be added to, modified, and/or deleted from the memory system 424.

Comprising any suitable type of processing system in the manner described in more detail above with reference to the processing system 322 (shown in FIG. 2A), the processing system 422 is configured to perform one or more functions, as necessary, on the instructions by the input system 410 and/or the incoming communication signals 510b provided by the database system 200. In the manner discussed above, the processing system 422 can perform the functions by receiving and executing a series of instructions, which can be provided in the form of instruction code that is stored in, and provided by, the memory system 424. The processing system 422 can provide the result of the functions to the interface audio system 430, the interface video system 440, the memory system 424, and/or the database system 200, as desired. For example, the processing system 422 can provide the outgoing communication signals 510a to the database system 200.

In the manner described above with reference to FIG. 1, the entertainment apparatus 300 can include a plurality of user interfaces 400. The entertainment apparatus 300 typically will have more than one user interface 400 when installed in a vehicle 800 (shown in FIGS. 7A-B). Each user interface 400 can be provided in the manner described in more detail above with regard to the user interface 400A (shown in FIG. 4A). The user interfaces 400 can share one or more common interface elements, as desired. As illustrated in FIG. 4B, for example, an entertainment apparatus 300F has a plurality of user interfaces 400B. The user interfaces 400B each include an input system 410, an interface audio system 430, and an interface video system 440 that are provided in the manner described above with reference to the user interface 400A. The user interfaces 400B, however, are configured to share a common interface processing system 420.

Being provided in the manner described above with reference to the interface processing system 420 (shown in FIG. 4A), the common interface processing system 420 couples the input system 410, the interface audio system 430, and the interface video system 440 for each user interface 400B. For each user interface 400B, the common interface processing system 420 is further configured to receive and process instructions provided by the input system 410 and/or the incoming communication signals 510b (shown in FIGS. 2A-B) provided by a database system 200 (shown in FIG. 1) and to provide the outgoing communication signals 510a (shown in FIGS. 2A-B) to the database system 200 in the manner described above. For example, when installed in the vehicle 800 having passenger seats 810 (shown in FIGS. 7A-B) that are divided into rows, the entertainment apparatus 300F can advantageously provide each passenger seat 810 with the user interface 400B such that each row of passenger seats 810 shares a common interface processing system 420.

Figure 5:
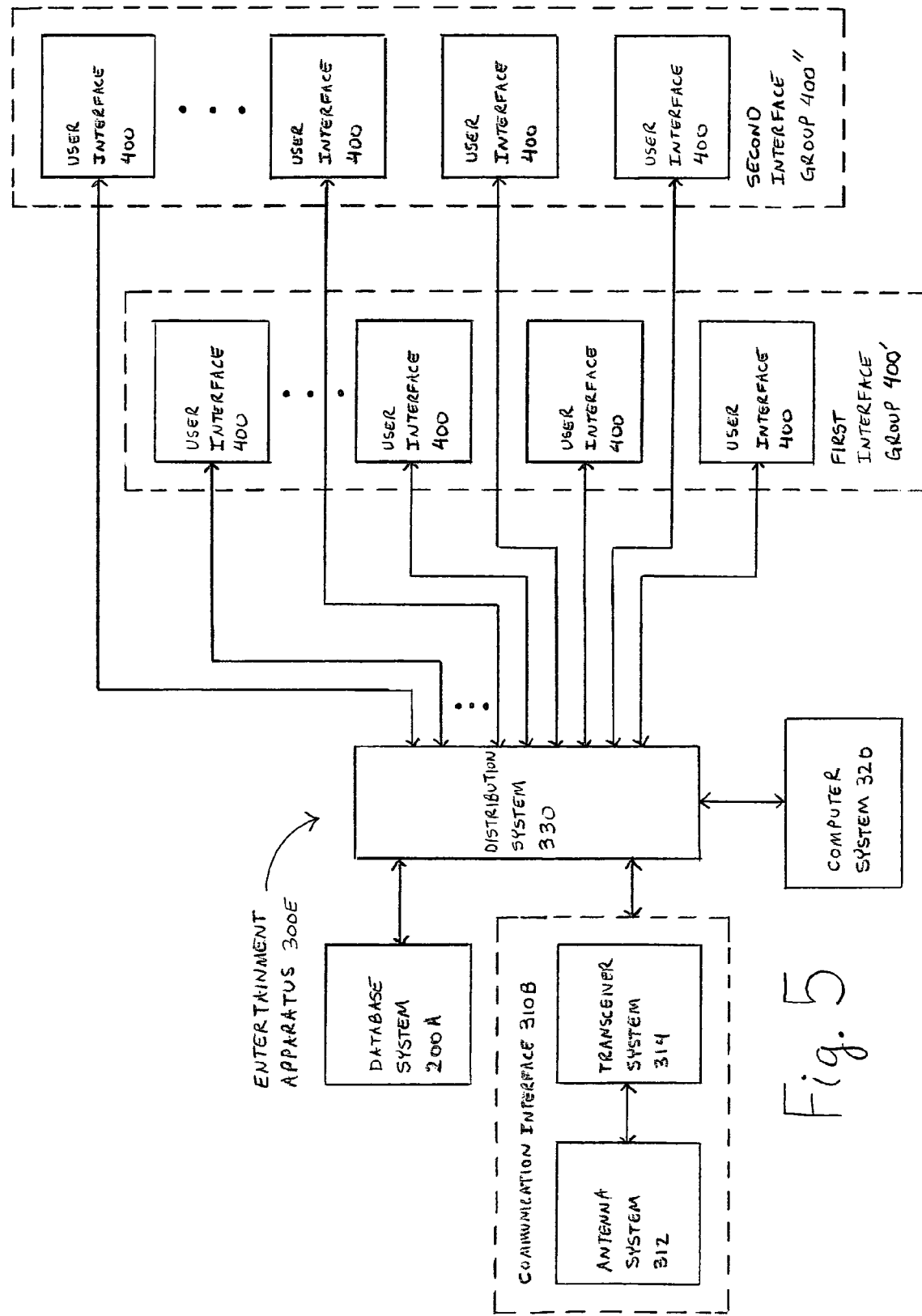
FIG. 5 is an exemplary block diagram illustrating an entertainment apparatus for the entertainment system of FIG. 1 in which the entertainment apparatus includes a plurality of user interfaces.

Turning to FIG. 5, an entertainment apparatus 300E is shown that comprises a database system 200A, a communication interface 310B that is configured to communicate with a database system 200B (shown in FIG. 2B), a computer system 320, and a plurality of user interfaces 400. The database system 200A and the computer system 320 are provided in the manner described in more detail above with reference to FIG. 2A; whereas, the user interfaces 400 are provided in the manner set forth above regarding the user interface 400A (shown in FIG. 4A). The communication interface 310B is provided, and is configured to communicate with the database system 200B, in the manner discussed above with reference to FIG. 2B. As shown in FIG. 5, the database system 200A, the communication interface 310B, the computer system 320, and the plurality of user interfaces 400 are coupled, and configured to communicate, via a distribution system 330.

The distribution system 330 can comprise any type of distribution system for distributing communication signals 510 (shown in FIGS. 2A-B). For example, the distribution system 330 can be provided as an analog distribution system, a digital distribution system, a modulated distribution system, a fiber optic distribution system, a wired distribution system, a wireless distribution system, and/or a broadband distribution system of any kind. In a preferred embodiment, the computer system 320 and the distribution system 330 form a communication network for coupling the database system 200A and the communication interface 310B with the user interfaces 400. The distribution system 330 is configured to receive the communication signals 510 (shown in FIGS. 2A-B) from the database system 200A and/or the communication interface 310B and to provide the communication signals 510 to the computer system 320 and/or one or more of the user interfaces 400. The computer system 320 and the user interfaces 400 can communicate via distribution system 330 provide the communication signals 510 to the database system 200A and/or the communication interface 310B.

If the entertainment apparatus 330E is installed on a vehicle 800 (shown in FIGS. 7A-B), for example, the distribution system 330 can comprise any suitable type of distribution, including a wired distribution system, in the manner discussed above. Preferably, the distribution system 330 is provided as a wireless local area network (WLAN) of any kind. Exemplary wireless local area networks include wireless fidelity (Wi-Fi) networks in accordance with Institute of Electrical and Electronics Engineers (IEEE) Standard 802.11 and/or wireless metropolitan-area networks (MANs) in accordance with IEEE Standard 802.16. Thereby, the database system 200A, the communication interface 310B, the computer system 320, and the plurality of user interfaces 400 can be coupled, and configured to communicate, without the weight and other drawbacks associated with wired communication systems that are installed in vehicles.

As desired, the entertainment apparatus 300E can be configured to store a copy, such as an archival copy, of the files downloaded via the communication interface 310B. The copy of the files can be stored, for example, by the database system 200A and/or the computer system 320. Being provided in the manner described above with reference to FIG. 2A, the database system 200A includes a server system 220 (shown in FIG. 2A) with a memory system 224 (shown in FIG. 2A); whereas, the computer system 320 includes a memory system 324 (shown in FIG. 2A). Preferably comprising a non-volatile memory system, the memory systems 224, 324, can comprise any suitable type of memory systems, including any electronic, magnetic, and/or optical storage mediums in the manner described above. The copy of the files preferably is stored on an array of hard disks. Although shown and described as separate systems for purposes of illustration, the database system 200A and the computer system 320 can be combined to form a single system.

The user interfaces 400 can be divided into two or more interface groups. As shown in FIG. 5, the user interfaces 400 are associated with one of two user interface groups: a first interface group 400'; and a second interface group 400". The user interfaces 400 can be divided into the interface groups 400', 400" based upon any criteria. If the entertainment apparatus 300E is installed on a vehicle 800 (shown in FIGS. 7A-B), for example, the first interface group 400' can be associated with a first class section of the vehicle 800; whereas, the second interface group 400" can be associated with a coach class section of the vehicle 800. Similarly, the first and second interface groups 400', 400" may be respectively associated with the operator and passengers of the vehicle 800. The functionality of the user interfaces 400 in the first interface group 400' can differ from the functionality of the user interfaces 400 in the second interface group 400". For example, the user interfaces 400 associated the first class section of the vehicle 800 can access premium content that is not available to the user interfaces 400 associated the coach class section. The user interfaces 400 associated the coach class section likewise might require payment of a fee prior to permitting access to the entertainment apparatus 300E; whereas, the user interfaces 400 associated the first class section may not require payment of the fee to access the entertainment apparatus 300E.

Returning to FIG. 4A, the illustrated user interface 400A includes one or more communication ports 450. Each communication port 450 can comprise any suitable type of communication port, including a wired communication port, such as a universal serial bus (USB) communication port, and/or a wireless communication port, such as an infrared (IR) communication port. Being configured to couple the user interface 400A with a peripheral device (not shown), the communication port 450 is coupled with, and configured to communicate with, the interface processing system 420. The peripheral device thereby can communicate with the interface audio system 430 and the interface video system 440 as well as with the database systems 200 via the entertainment apparatus 300.

FIG. 6A illustrates a user interface 400C that includes a personal entertainment system 600A. The personal entertainment system 600A preferably comprises a portable personal entertainment system, such as a laptop computer, a personal digital assistant (PDA), or a MPEG Audio Layer 3 (MP3) device. As shown in FIG. 6A, the personal entertainment system 600A includes an input system 610, an audio system 630, a video system 640, a memory system 660, and/or a communication port 650A, each being coupled, and configured to communicate, via a processing system 620. The input system 610 permits a user to communicate instructions to the personal entertainment system 600A. Typically comprising one or more pushbuttons (not shown), such as a keyboard or a keypad, and/or a pointing device (not shown), such as a mouse, trackball, or stylus, the input system 610 can be provided in any suitable manner.

As illustrated in FIG. 6A, the communication port 650A of the personal entertainment system 600A can be removably coupled with a communication port 450A of the user interface 400C via a wired communication system 700, such as a communication bus 700A. The personal entertainment system 600A and the user interface 400C thereby are configured to exchange communication signals 710. By coupling the personal entertainment system 600A with the user interface 400C, the input system 610 can communicate instructions to the entertainment apparatus 300 (shown in FIG. 1) in the manner described above with reference to the input system 410 (shown in FIG. 4A). As a result, the user can employ the input system 610 to access the available database systems 200 (shown in FIG. 1), to select one or more files from the available file libraries, and/or to control the presentation of the selected files.

In the manner described above regard the interface audio system 430 (shown in FIG. 4A) and the interface video system 440 (shown in FIG. 4A), the entertainment apparatus 300 is configured to communicate with the user via the audio system 630 and/or the video system 640 of the personal entertainment system 600A. The audio system 630 can audibly present information to the user; whereas, the video system 640 can present information to the user visually. In the manner described above with reference to the user interface 400A (shown in FIG. 4A), the personal entertainment system 600A can be configured to present any type of information, including instructions for using the entertainment system 100, a catalog of file libraries available for download, and any downloaded files. For example, the video system 640 can provide a graphical user interface (GUI) to facilitate interaction with the entertainment system 100 and/or an interactive menu of the available file libraries, including files available for downloading and/or files previously downloaded to the personal entertainment system 600A in the manner set forth above.

Once the user has made his selection and, as necessary, entered his payment and/or authorization information, the personal entertainment system 600A can download the selected files. The audio system 630 and the video system 640 of the personal entertainment system 600A are respectively configured to present an audio portion and a video portion of the files. In the manner described above with reference to FIG. 4A, the personal entertainment system 600A can provide additional functionality for controlling the presentation of the files. For example, the input system 610 can be configured to rewind, fast forward, and/or pause the presentation the files. The input system 610 likewise can include a volume control, mixing, equalization, and/or muting functions and/or can perform general file management functions, such as transferring and/or deleting one or more of the files and can provide a file directory to facilitate organization of the files. As desired, the input system 610 can provide file editing functionality.

In the manner described above regarding the interface audio system 430 (shown in FIG. 4A), the audio system 630 can include a speaker system and one or more audio communication ports (not shown). The audio communication ports can include one or more audio output ports, audio input ports, and/or microphone ports. The audio portion of the selected file thereby can be audibly presented via the speaker system and/or a secondary speaker system, such as a set of head phones, that is coupled with the audio output port. The video system 640 can have a display system (not shown) in the manner described above regarding the interface video system 440 (shown in FIG. 4A). The video system 640 can visually present the video portion of the selected file and can be configured to visually present graphical information and/or textual information. The manner by which the video portion of the selected file is processed and/or visually presented preferably is controllably via the input system 610.

The processing system 620 can receive and process instructions provided by the input system 610 and/or the communication signals 710 provided by a database system 200 (shown in FIG. 1) and provide the communication signals 710 to the database system 200 in the manner described above with reference to the interface processing system 420 (shown in FIG. 4A). The memory system 660 is coupled with, and configured to communicate with, the processing system 620 and is configured to receive and store the selected files downloaded from the database system 200 and, under the control of the input system 610, to provide the files to the audio system 630 and/or the video system 640 for presentation. Preferably comprising a non-volatile memory system, the memory system 660 can comprise any suitable type of memory system, including any electronic, magnetic, and/or optical storage mediums in the manner described above regarding the memory system 424 (shown in FIG. 4A). The input system 610 preferably is configured to permit files to be added to, modified, and/or deleted from the memory system 660.

Advantageously, the memory system 660 is configured to retain the files even if the personal entertainment system 600A is disconnected from the user interface 400C. The files therefore can be presented via the personal entertainment system 600A even when the personal entertainment system 600A is no longer in communication with the entertainment apparatus 300 (shown in FIG. 1) and/or the database systems 200 (shown in FIG. 1). Therefore, if the entertainment apparatus 300 is installed in a vehicle 800 (shown in FIGS. 7A-B), for example, a passenger in the vehicle 800 can download the selected files during travel. Once stored, the files can be retained in the memory system 660 of the personal entertainment system 600A, which can be disconnected from the entertainment apparatus 300. The passenger thereby can view the files at any time, including after disembarking the vehicle 800 once travel is completed, by removing the personal entertainment system 600A from the vehicle 800.

The user interface 400D shown in FIG. 6B includes a personal entertainment system 600B that is coupled with the user interface 400D via a wireless communication system 700B. Being provided in the manner described above with regard to the personal entertainment system 600A (shown in FIG. 6A), the personal entertainment system 600B includes an input system 610, an audio system 630, a video system 640, a memory system 660, and/or a communication port 650B, each being coupled, and configured to communicate, via a processing system 620. The communication port 650B of the personal entertainment system 600B is configured to communicate with a communication port 450B of the user interface 400D. As illustrated in FIG. 6B, the communication port 650B of the personal entertainment system 600B can be removably coupled with the communication port 450B of the user interface 400D via the wireless communication system 700B. The personal entertainment system 600B and the user interface 400D thereby are configured to exchange communication signals 710.

By coupling the personal entertainment system 600B with the user interface 400D, the input system 610 can communicate instructions to the entertainment apparatus 300 (shown in FIG. 1) in the manner described above with reference to the personal entertainment system 600A (shown in FIG. 6A). As a result, the user can employ the input system 610 to access the available database systems 200 (shown in FIG. 1), to select one or more files from the available file libraries, and/or to control the presentation of the selected files. In the manner described above, the personal entertainment system 600B is advantageously configured to retain the files even if the personal entertainment system 600B is disconnected from the user interface 400D. The files therefore can be presented via the personal entertainment system 600B even when the personal entertainment system 600B is no longer in communication with the entertainment apparatus 300 (shown in FIG. 1) and/or the database systems 200 (shown in FIG. 1).

Figure 7A:
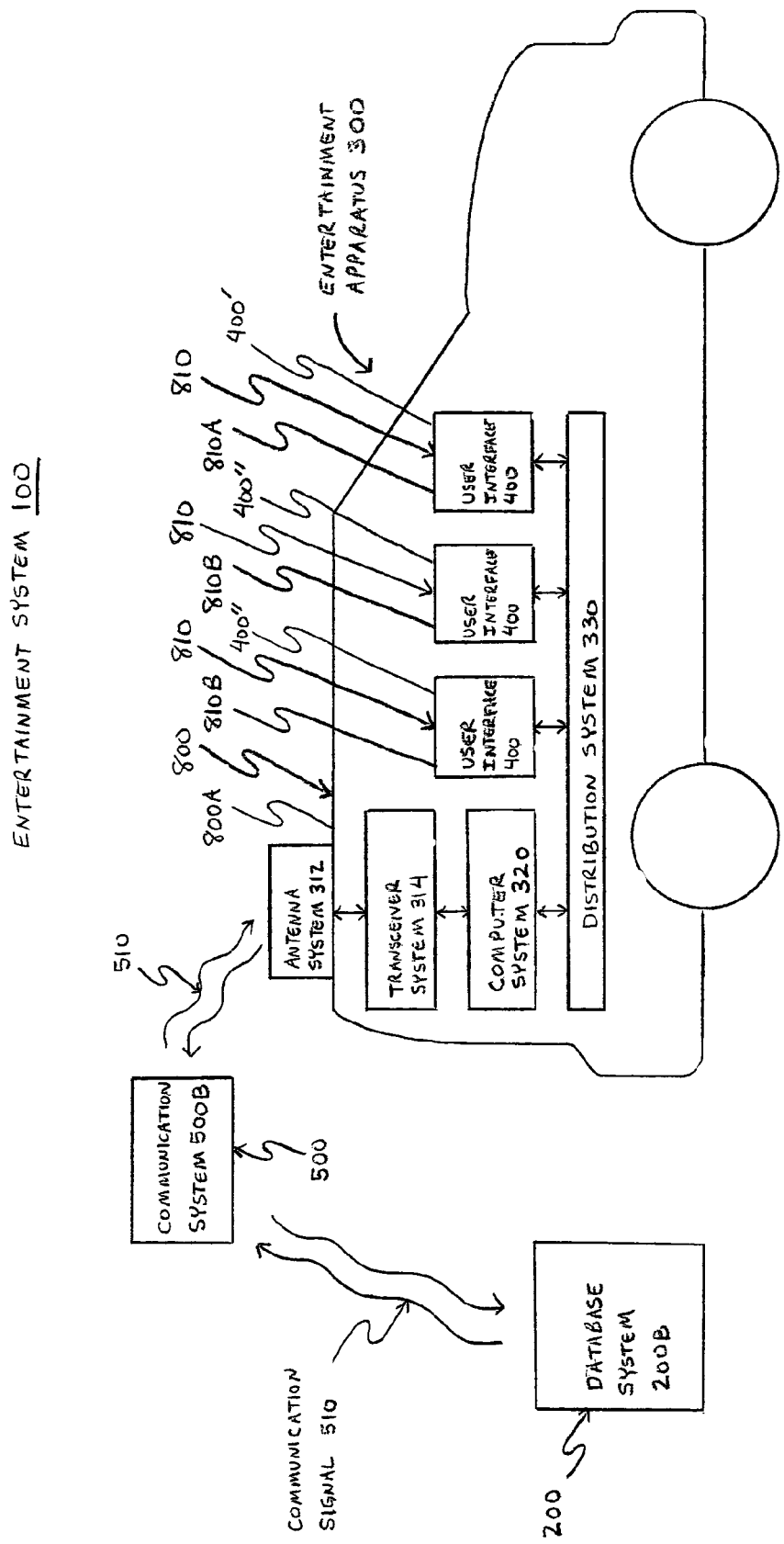
FIG. 7A is a detail drawing illustrating one embodiment of the entertainment system of FIG. 1 in which the entertainment apparatus is installed in an automobile.

The entertainment apparatus 300 (shown in FIG. 1) can be installed in a wide variety of vehicles 800, such as an automobile, a bus, an aircraft, a boat, or a locomotive of any kind. FIG. 7A illustrates the entertainment system 100 with the entertainment apparatus 300 being installed in an automobile 800A. As shown in FIG. 7A, an antenna system 312 is mounted on the automobile 800A and is configured to exchange communication signals 510 with a database system 200B via a communication system 500B in the manner set forth above with reference to FIG. 2B. The antenna system 312 is coupled with a transceiver system 314, which can receive and process the communication signals 510 and which is configured to provide the processed communication signals 510 to a computer system 320 in the manner discussed above. The transceiver system 314 likewise can receive and process the communication signals 510 provided by the computer system 320 and can provide the processed communication signals 510 to the antenna system 312. The computer system 320, in turn, is configured to communicate with one or more user interfaces 400 via a distribution system 330.

As shown in FIG. 7A, the user interfaces 400 can be associated with seats 810 in the automobile 800A. For example, a driver seat 810A is provided with a user interface 400 that is associated with a first interface group 400'; whereas, passenger seats 810B include user interfaces 400 that are associated with a second interface group 400". In the manner discussed with regard to FIG. 5, the functionality of the user interfaces 400 in the first interface group 400' can differ from the functionality of the user interfaces 400 in the second interface group 400". For example, since the driver needs to pay attention to the road, the user interface 400 associated with the first interface group 400' likely does not include an interface video system 440 (shown in FIG. 4A); whereas, the user interfaces 400 in the second interface group 400" can include interface video systems 440. Similarly, the input system 410 (shown in FIG. 4A) for the user interface 400 in the first interface group 400' can be configured to mute the interface audio systems 430 (shown in FIG. 4A) for each of the user interfaces 400 in the automobile 800A.

Figure 7B:
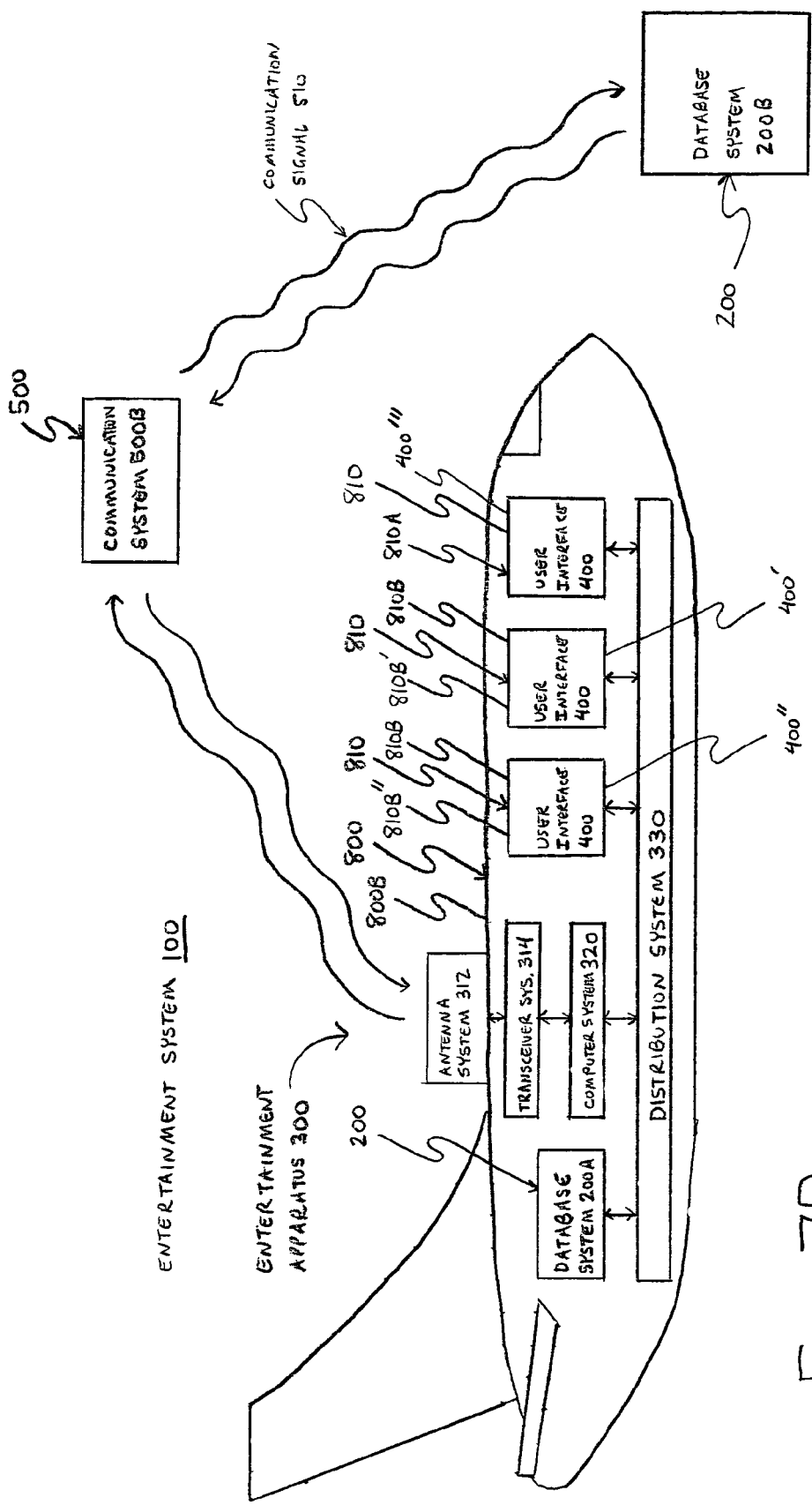
FIG. 7B is a detail drawing illustrating an alternative embodiment of the entertainment system of FIG. 7A in which the entertainment apparatus is installed in an aircraft.

As desired, the entertainment apparatus 300 of the entertainment system 100 likewise can be installed in an aircraft 800B as illustrated in FIG. 7B. As shown in FIG. 7B, an antenna system 312 is mounted on the outer fuselage of the aircraft 800B and is configured to exchange communication signals 510 with a database system 200B via a communication system 500B in the manner set forth above with reference to FIG. 2B. The antenna system 312 is coupled with a transceiver system 314, which can receive and process the communication signals 510 and which is configured to provide the processed communication signals 510 to a computer system 320 in the manner discussed above. The transceiver system 314 likewise can receive and process the communication signals 510 provided by the computer system 320 and can provide the processed communication signals 510 to the antenna system 312.

The computer system 320 also is coupled with a database system 200A. The database system 200A is provided in the manner described above with reference to FIG. 2A and is disposed within the aircraft 800B. Being configured to communicate with the database system 200A in the manner described above, the computer system 320 is configured to exchange communication signals 510 with the database system 200A via a distribution system 330. Thereby, the computer system 320 can communicate with, and download one or more selected files from, the database system 200A and the database system 200B.

The distribution system 330 likewise couples the computer system 320 with one or more user interfaces 400. As shown in FIG. 7B, the user interfaces 400 can be associated with seats 810 in the aircraft 800B. For purposes of illustration, the seats 810 in the aircraft 800B are divided into three interface groups. Seats 810A comprise seats for the flight crew; whereas, seats 810B comprise passenger seats. The passenger seats 810B are further divided into first class passenger seats 810B' and coach class passenger seats 810B", which include user interfaces 400 and are respectively associated with first and second interface groups 400', 400". The flight crew seats 810A also include user interfaces 400 that are associated with a third interface group 400'''.

As was discussed above, the functionality of the user interfaces 400 in the three interface groups 400', 400", and 400''' can differ. In the manner set forth above with reference to FIG. 7A, the user interfaces 400 provided on the flight crew seats 810A likely does not include an interface video system 440 (shown in FIG. 4A); whereas, the user interfaces 400 for the passenger seats 810B can include interface video systems 440. The input system 410 (shown in FIG. 4A) for the user interfaces 400 provided on the flight crew seats 810A can be configured to mute the interface audio systems 430 (shown in FIG. 4A) for each of the user interfaces 400 in the aircraft 800B.

Further, the functionality of the user interfaces 400 for the first class passenger seats 810B' can differ from the functionality of the user interfaces 400 for the coach class passenger seats 810B". In the manner discussed above regarding FIG. 5, the user interfaces 400 associated the first class passenger seats 810B' can, for example, access premium content that is not available to the user interfaces 400 associated the coach class passenger seats 810B". The user interfaces 400 associated the coach class passenger seats 810B" likewise can require a fee to be paid prior to permitting access to the entertainment apparatus 300; whereas, the user interfaces 400 associated the first class passenger seats 810B' may be able to access the entertainment apparatus 300E without requiring payment of the fee.

With reference to FIGS. 7A-B, it will be appreciated that the entertainment system 100 can be configured to download and present files that relate to the destination of the vehicle 800. For example, passengers can download files that provide information relating to hotel accommodations or a map of the destination city. If the destination is an airport terminal, files comprising information, such as arrival and departure times and gate information, for other flights may be downloaded to assist the passenger with making his connecting flight or with meeting others who are arriving at the airport terminal on different flights.

FIGS. 8A-D illustrate various configurations for the user interface 400 (shown in FIG. 4A) when the entertainment apparatus 300 (shown in FIG. 1) is installed in a vehicle 800. The user interfaces 400 include an input system 410, an interface audio system 430 (shown in FIG. 4A), and an interface video system 440 (shown in FIG. 4A). Turning to the user interface 400 shown in FIG. 8A, the interface video system 440 has a display system 444 for visually presenting information from the entertainment apparatus 300. The illustrated display system 444 is provided as one or more overhead display systems 444A. The input system 410 is provided on an armrest 820 of the seats 810 as shown in FIG. 8A. The seats 810 are shown as comprising seats 810A and seats 810B, and the user interfaces 400 for the seats 810A, 810B are respectively associated with first and second first interface groups 400', 400". Having different levels of functionality, the input system 410 for the seats 810A include functionality 410A, which functionality is not provided on the input system 410 for the seats 810A.

The interface audio system 430 illustrated in FIG. 8A includes a speaker system 434 for audibly presenting information from the entertainment apparatus 300. The speaker system 434 can comprise one or more overhead speakers 434A and/or one or more speaker systems disposed within the seats 810 of the vehicle 800. Within the seats 810, the speaker systems 434 can be provided in any suitable manner, including, for example, as a speaker system 434B in the headrest 840 of the seat 810 and/or in the base 850 of the seat 810. In the manner discussed above with reference to FIG. 4A, the interface audio system 430 likewise can include one or more audio communication ports, such as an audio output ports 436, for audibly presenting information. The audio output ports 436 can be provided, for example, on the armrest 820 of the seats 810 as shown in FIG. 8A.

The display system 444 of the user interface 400 shown in FIG. 8B includes one or more overhead display systems 444A provided in the manner discussed above with reference to FIG. 8A as well as one or more seatback display systems 444B being coupled with a back surface 860 of the seatback 830. The input system 410 likewise can include be provided with functionality 410A that is accessible via the armrest 820 of the seats 810 and/or functionality 410B that is provided on the back surface 860 of the seatback 830 as shown in FIG. 8B. As desired, the seatback display systems 444B can be provided substantially separately from, or in combination with, the functionality 410B. The seatback display systems 444B, for example, can comprise touch screens to provide the functionality 410B on the seatback 830.

In contrast to the seats 810 shown in FIG. 8A, the seats 810 in FIG. 8B are not divided into interface groups 400', 400" and have substantially the same level of functionality. As such, the input systems 410 for the seats 810 both include functionality 410A. Being provided in the manner discussed above with reference to FIG. 8A, the speaker system 434 in FIG. 8B includes one or more overhead speakers 434A. No speaker systems 4343 are shown as being disposed in the seats 810 in FIG. 8B. The interface audio system 430 likewise has one or more audio communication ports, such as an audio output ports 436, which are provided on the armrest 820 of the seats 810.

FIG. 8C illustrates a user interface 400 with a display system 444 that includes one or more seatback display systems 444B and with an input system 410 that is provided on the armrest 820 of the seats 810, each being provided in the manner discussed above with reference to FIG. 8B. The interface audio system 430 of the user interface 400 is shown as having one or more audio communication ports, such as an audio output ports 436, which are provided on the armrest 820 of the seats 810. For audio information to be audibly presented by the user interface 400 of FIG. 8C, a peripheral device (not shown), such as a set of head phones, is coupled with the audio output port 436.

The user interface 400 of FIG. 8D is shown as including a personal entertainment system 600. As illustrated in FIG. 8D, the personal entertainment system 600 is removably coupled with the user interface 400 via a communication port 450 that is provided by the input system 410. Although user interface 400 provides one or more seatback display systems 444B, information from the entertainment apparatus 300 can be visually presented via a video system 640 of the personal entertainment system 600. The personal entertainment system 600 likewise includes an input system 610, which can be used to provide instructions to the entertainment apparatus 300 in the manner discussed above. Similarly, information from the entertainment apparatus 300 can be audibly presented via an audio system 630 of the personal entertainment system 600.

Although the coupling between the personal entertainment system 600 and the user interface 400 is illustrated as a wired connection, a wireless connection can be employed to couple the personal entertainment system 600 and the user interface 400. In a preferred embodiment, for example, the entertainment apparatus 300 as installed in the vehicle 800 can comprise a hot spot. The hot spot can be provided as a wireless local area network (WLAN) of any kind, including a wireless fidelity (Wi-Fi) network in accordance with Institute of Electrical and Electronics Engineers (IEEE) Standard 802.11 and/or a wireless metropolitan-area network (MAN), which also is known as WiMax Wireless Broadband, in accordance with IEEE Standard 802.16. Thereby, upon entering the vehicle 800, the personal entertainment system 600 can automatically establish communications with the entertainment apparatus 300, and communications with the entertainment apparatus 300 can automatically terminate when the personal entertainment system 600 is removed from the vehicle 800.

In the manner discussed above, the personal entertainment system 600 is advantageously configured to retain the files downloaded via the entertainment apparatus 300 even if the personal entertainment system 600 is disconnected from the user interface 400. The files therefore can be presented via the personal entertainment system 600 even when the personal entertainment system 600 is disconnected from the communication port 450. Therefore, if a passenger in the vehicle 800 downloads selected files during travel, the files can be stored and retained by the personal entertainment system 600. The passenger thereby can view the files at any time, including after disembarking the vehicle 800 once travel is completed, by removing the personal entertainment system 600 from the vehicle 800.

The disclosure is susceptible to various modifications and alternative forms, and specific examples thereof have been shown by way of example in the drawings and are herein described in detail. It should be understood, however, that the disclosure is not to be limited to the particular forms or methods disclosed, but, to the contrary, the disclosure is to cover all modifications, equivalents, and alternatives falling within the spirit and scope of the claims.

What is claimed is:

1. A vehicle information system suitable for installation aboard a passenger vehicle, comprising:
   - a local content source for providing a first content library associated with a first passenger seat group within the passenger vehicle;
   - a headend system for communicating with a remote content source including a second content library associated with a second passenger seat group within the passenger vehicle and for providing a first content catalog of first entertainment files available from the first content library and a second content catalog of second entertainment files available from the second content library, the second content catalog having file information, including a title, a content description, and a content rating, for each of the second entertainment files;
   - a first portable media device associated with the first passenger seat group for automatically initializing wireless communications with said headend system and providing a first operational status of said first portable media device upon boarding the passenger vehicle, said first portable media device for presenting the first content catalog, for enabling selection of a selected first entertainment file via the first content catalog, and for receiving the entire selected first entertainment file from the first content library via said headend system; and
   - a second portable media device associated with the second passenger seat group for automatically initializing wireless communications with said headend system and providing a second operational status of said second portable media device upon boarding the passenger vehicle, said second portable media device for presenting the second content catalog having the file information and for enabling selection of a second entertainment file via the second content catalog, said headend system verifying the content rating of the selected second entertainment file satisfies a predetermined content standard, and enabling said second portable media device to receive the entire verified second entertainment file from the second content library and said local content source storing an archival copy of the verified second entertainment file in an appropriate file library based upon the file information,
   - wherein the second content library is different from the first content library and is not available to said first portable media device,
   - wherein said first and second portable media devices can respectively present the selected first and second entertainment files regardless of whether said first and second portable media devices are in communication with said headend system, and
   - wherein said second portable media device is configured to upload a passenger entertainment file associated with passenger file information, including a title, a content description, and a content rating, to said local content source for subsequent download by another portable media device, and wherein said headend system verifies the content rating of the passenger entertainment file satisfies the predetermined content standard and enables said local content source to receive and store the verified passenger entertainment file in an appropriate file library based upon the passenger file information.

2. The vehicle information system of claim 1, wherein said second portable media device includes:
   - a handheld case having a predetermined shape and including a communication port;
   - a transceiver system for wirelessly communicating with said headend system via the communication port, said transceiver system disposed within said handheld case;
   - an integrated user interface system provided on said handheld case, including:
     - a video presentation system for selecting among the second entertainment files available from the second content library via a menu-based system and for presenting a video portion of the verified second entertainment file;
an audio presentation system for presenting an audio portion of the verified second entertainment file; and
a touchscreen control system for selecting the verified second entertainment file for presentation and controlling the presentation of the verified second entertainment file.

3. The vehicle information system of claim 1, wherein the file information for the second content catalog includes download fee information for each of the second entertainment files, the download fee information identifying files within the second content library that can be made available to said first portable media device upon payment of a fee.

4. The vehicle information system of claim 3, wherein the file information for the second content catalog includes content preview information for each of the second entertainment files, the content preview information identifying files within the second content library for which a content preview is available for presentation via said first portable media device prior to the payment of the fee.

5. The vehicle information system of claim 3, wherein said first portable media device includes a credit card reader for receiving transaction information in payment of the fee, said credit card reader being disposed upon a handheld housing of said first portable media device.

6. The vehicle information system of claim 5, wherein the remote content source processes the transaction information by calculating a total fee, generating a transaction report, and forwarding the transaction report to a billing address associated with the transaction information.

7. The vehicle information system of claim 1, further comprising a plurality of said first portable media devices and a plurality of said second portable media devices.

8. An aircraft including a vehicle information system provided in accordance with claim 1.

9. The vehicle information system of claim 1, wherein the content rating of the second entertainment files includes parent labeling guideline requirements.

10. The vehicle information system of claim 1, wherein said headend system updates the first content catalog to include the file information for the archival copy of the selected verified second entertainment file and the passenger file information for the passenger entertainment file such that each file is available for subsequent download by said first portable media device.

11. The vehicle information system of claim 1, wherein the passenger entertainment file comprises destination information that is associated with a travel destination of the passenger vehicle, the destination information being selected from a group consisting of a map of a destination city, travel route information related to the destination city, hotel accommodation information, and additional travel information.

12. The vehicle information system of claim 1, wherein said headend system identifies whether the passenger entertainment file and any second entertainment files available from the second content library do not satisfy the predetermined content standard and inhibits dissemination and storage of the identified files within the vehicle information system.

13. A method for distributing viewing content aboard a passenger vehicle, comprising:
providing a headend system including a local content source for providing a first content library associated with a first passenger seat group within the passenger vehicle, said headend system for communicating with a remote content source including a second content library associated with a second passenger seat group within the passenger vehicle;
providing a first content catalog of first entertainment files available from the first content library and a second content catalog of second entertainment files available from the second content library, the second content catalog having file information, including a title, a content description, and a content rating, for each of the second entertainment files;
initializing automatically a first portable media device associated with the first passenger seat group to wirelessly communicate with said headend system and providing a first operational status of said first portable media device upon boarding the passenger vehicle;
presenting the first content catalog via the first portable media device;
enabling the first portable media device to select a first entertainment file via the first content catalog and to receive the entire selected first entertainment file from the first content library via said headend system;
initializing automatically a second portable media device associated with the second passenger seat group to wirelessly communicate with said headend system and providing a second operational status of said second portable media device upon boarding the passenger vehicle;
presenting the second content catalog having the file information via the second portable media device; and
enabling the second portable media device to select a selected second entertainment file via the second content catalog;
verifying the content rating of the selected second entertainment file satisfies a predetermined content standard,
enabling the second portable media device to receive the entire verified second entertainment file from the second content library via said headend system;
enabling the local content source to store an archival copy of the verified second entertainment file in an appropriate file library based upon the file information; and
configuring the second portable media device to upload a passenger entertainment file associated with passenger file information, including a title, a content description, and a content rating to said local content source for subsequent download by another portable media device, verifying the content rating of the passenger entertainment file satisfies the predetermined content standard, and enabling the local content source to receive and store the verified passenger entertainment file in an appropriate file library based upon the passenger file information,
wherein the second content library is different from the first content library and is not available to said first portable media device, and
wherein said first and second portable media devices can respectively present the selected first and second entertainment files regardless of whether said first and second portable media devices are in communication with said headend system.

14. The method of claim 13, further comprising updating the first content catalog to include the archival copy of the verified second entertainment file and a passenger entertainment file; and enabling each file to be available for subsequent download by the first portable media device.

15. The method of claim 13, further comprising:
identifying any second entertainment files available from the second content library that do not satisfy the predetermined content standard; and
inhibiting the second portable media device from receiving the identified second entertainment files.

* * * * *